(12) United States Patent
Pitigoi-Aron et al.

(10) Patent No.: US 10,007,628 B2
(45) Date of Patent: Jun. 26, 2018

(54) DYNAMICALLY ADJUSTABLE MULTI-LINE BUS SHARED BY MULTI-PROTOCOL DEVICES

(71) Applicant: QUALCOMM Incorporated, San Diego, CA (US)

(72) Inventors: Radu Pitigoi-Aron, San Jose, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 14/728,777

(22) Filed: Jun. 2, 2015

(65) Prior Publication Data
US 2015/0370735 A1 Dec. 24, 2015

Related U.S. Application Data

(60) Provisional application No. 62/013,818, filed on Jun. 18, 2014.

(51) Int. Cl.
*G06F 13/00* (2006.01)
*G06F 13/364* (2006.01)
*G06F 13/42* (2006.01)

(52) U.S. Cl.
CPC ........ *G06F 13/364* (2013.01); *G06F 13/4282* (2013.01); *G06F 13/4291* (2013.01); *G06F 13/4295* (2013.01)

(58) Field of Classification Search
CPC .... G06F 13/4081; G06F 13/00; G06F 13/385; G06F 13/4022; G06F 13/409;
(Continued)

(56) References Cited

U.S. PATENT DOCUMENTS 6,173,347 B1 * 1/2001 Emmerich ............ G06F 13/423
710/104
6,253,268 B1 * 6/2001 Bjorkengren ......... G06F 13/385
710/105

(Continued)

FOREIGN PATENT DOCUMENTS

| EP | 1061453 A1 | 12/2000 |
| WO | WO-9734238 A1 | 9/1997 |
| WO | WO-0042748 A1 | 7/2000 |

OTHER PUBLICATIONS

Anonymous: "The I2C-Bus Specification", Philips Semiconductors, No. Version 2.1, Jan. 1, 2000 (Jan. 1, 2000), pp. 1-46, XP002590803, Retrieved from the Internet: URL:http://www.nxp.comjacrobat download2/literature/9398/39340011.pdf—[retrieved on Jul. 7, 2010] the whole document.

(Continued)

*Primary Examiner* — Tim T Vo
*Assistant Examiner* — Kim T Huynh
(74) *Attorney, Agent, or Firm* — Loza & Loza LLP

(57) ABSTRACT

A device is provided that has a bus including a first line and a second line. A first set of devices are coupled to the bus and, in a first mode of operation, configured to use the first line for data transmissions and use the second line for a first clock signal. One or more additional lines are connected between two or more of the devices in the first set of devices for transmitting signaling between the two or more devices. A second set of devices are configured to use the bus and at least one of the additional lines for data transmissions in a second mode of operation, where in the second mode of operation symbols are encoded across the first line, the second line, and the at least one of the additional lines.

33 Claims, 19 Drawing Sheets

(58) Field of Classification Search
CPC .............. G06F 13/4063; G06F 13/4068; G06F 2213/0024; G06F 2213/0026; H04N 2201/0058
USPC ................................. 710/300–306, 100, 110
See application file for complete search history.

(56) References Cited

U.S. PATENT DOCUMENTS

| | | |
|---|---|---|
| 2005/0165989 A1 | 7/2005 | Kim |
| 2007/0016708 A1* | 1/2007 | Park .................... G06F 13/4022 710/110 |
| 2012/0166702 A1* | 6/2012 | Toba .................... G06F 13/4068 710/316 |
| 2012/0324131 A1 | 12/2012 | Chang |
| 2014/0149617 A1* | 5/2014 | Chiang ................. G06F 13/364 710/110 |
| 2018/0046595 A1 | 2/2018 | Pitigoi-Aron et al. |

OTHER PUBLICATIONS

International Search Report and Written Opinion—PCT/US2015/033911—ISA/EPO—dated Mar. 7, 2016.
European Search Report—EP17173736—Search Authority—Munich—dated Sep. 21, 2017.

* cited by examiner

DYNAMICALLY ADJUSTABLE MULTI-LINE BUS SHARED BY MULTI-PROTOCOL DEVICES

CROSS-REFERENCE TO RELATED APPLICATIONS

This application claims priority to and the benefit of Provisional Patent application No. 62/013,818 filed in the U.S. Patent Office on Jun. 18, 2014, the entire content of which is incorporated herein by reference.

BACKGROUND

Field

The present disclosure relates generally to an interface between a host processor and a peripheral device and, more particularly, to an interface and dynamically adjustable shared bus connecting both next-generation and legacy sensors and accommodating multiple modes of operation.

Background

Manufacturers of mobile devices, such as cellular phones, may obtain components of the mobile devices from various sources, including different manufacturers. For example, an application processor in a mobile computing device may be obtained from a first manufacturer, while sensors employed by the mobile computing device may be obtained from one or more other manufacturers. Various standards-based or proprietary interfaces have been defined, typically directed to a specific application or type of application. For example, cellular telephones may use a communications interface that is compatible with or conforms to an Inter-Integrated Circuit (I2C) compatible bus standard specified by the Mobile Industry Processor Interface Alliance (MIPI).

The I2C interface has become a widely adopted communication interface that may be optimized for specific applications. For example, the MIPI standards define a camera control interface (CCI) that uses a two-wire, bi-directional, half duplex, serial interface configured as a bus connecting a master and one or more slaves. Thus, the CCI protocol uses the I2C Serial Clock (SCL) and Serial Data (SDA) lines, and CCI devices and I2C devices can be deployed on the same bus such that two or more CCI devices may communicate using CCI protocols, while any communication involving an I2C bus uses I2C protocols. Later versions of CCI can provide higher throughputs using modified protocols to support faster signaling rates. Similarly, I2C may be implemented for sensor interfaces. However, the advent of new sensors, together with a need for backward compatibility to support legacy sensors and power savings for "always-on" type applications, requires high data rate throughputs that are beyond the capability of legacy I2C. Some sensors examples that are targeted for such higher throughput speeds are aggregated sensors, sensors hubs, touch sensors, low definition camera sensors, etc. However, the challenge remains of how to provide higher throughputs for next-generation sensor devices while concurrently accommodating operation of legacy sensor devices on the same bus.

There exists an ongoing need for providing optimized communications on serial interfaces configured as a bus connecting different types of peripherals or cooperating devices to a processor.

SUMMARY

Embodiments disclosed herein provide systems, methods and apparatus that can improve the performance of a two-wire serial bus such as a sensors global bus (SGbus).

In an aspect of the disclosure, a method of data communications relates to a first device operating as a master device over a shared bus to which one or more slave devices are coupled. The first device may establish a connection on the two-wire serial bus with a second device, coupled to the two-wire serial bus, using a predefined base protocol. The first device may determine the availability of one or more additional connectors, wires, and/or lines that are configurable for data communications between the first device and the second device. In a higher-speed mode of operation, the first device may switch from using the predefined base protocol to a second protocol having a higher data throughput than the predefined base protocol. The second protocol may encode data in sequences of symbols for transmission over a combination of lines that includes the two-wire bus and at least one or more additional connectors, lines, and/or wires so as to transmit the sequences of symbols over the combination of connectors, lines and/or wires. Clock information may be encoded in transitions between pairs of consecutive symbols in the sequences of symbols that are transmitted over the two-wire bus and the at least one or more additional connectors, lines, and/or wires.

In another aspect, the predefined base protocol includes a protocol that is compliant or compatible with an I2C mode of data communications. The predefined base protocol may be similar to a CCI data transport mode in which a first wire of the two-wire bus is used for serial data communications and a second wire of the two-wire bus is used for a clock signal.

In one example, in contrast to the two-wired based protocol used in I2C for transferring data, a high data rate (HDR) protocol may be implemented based on coded symbols. In this HDR protocol, a clock may be embedded in the data stream (e.g., within the symbol transitions). This HDR protocol may be adapted to sensor applications and symbol coding may be expanded to use more than two wires (e.g., by repurposing lines used for other purposes in the predefined base protocol). Note that other types of busses and/or interfaces operable between devices may also be adapted to operate according to such HDR protocol. Additionally, symbol coding may be implemented on two, three or more wires. In various implementations, the embedded clock may be transmitted over one line/wire or over multiple lines. Additionally, multiple embedded clocks may be transmitted over different lines or sets of lines. Each embedded clock may support different configurations, for example.

In another aspect, the one or more additional connectors, lines, and/or wires may include a connector, line, and/or wire that is operable for transmitting an interrupt signal between the first device and the second device. The one or more additional connectors, lines, and/or wires may include a shared connector, line, and/or wire that is coupled between the first device (e.g., master device) and one or more slave devices. For instance, in one example, a connector, line, and/or wire may extend solely between the first device and the second device. In another example, the connector, line, and/or wire may extend between the first device, the second device, and a third device.

In another aspect, each of the sequences of symbols may include 12 symbols. Each of the sequences of symbols, when spread over three wires, may encode a 33-bit binary word, for example.

In another aspect, after communications using three or more wires, conductors, and/or lines using the second protocol (e.g., sequences of symbols), communications on the two-wire serial bus may resume in accordance with the predefined base protocol associated with the two-wire serial bus. Communications using the predefined base protocol typically involves only the two-wire serial bus.

In another aspect, clock information may be encoded in transitions of signaling state of only the two-wire serial bus. Clock information may be encoded in transitions of signaling state of the combination of connectors.

In an aspect of the disclosure, a device includes a bus having a first line and a second line, a first set of devices coupled to the bus and, in a first mode of operation, configured to use the first line for data transmissions and use the second line for a first clock signal, one or more additional lines connecting two or more of the devices in the first set of devices for transmitting signaling between the two or more devices, a second set of devices, within the first set of devices, further configured to use the bus and at least one of the additional lines for data transmissions in a second mode of operation. In the second mode of operation, symbols are encoded across the first line, the second line, and the at least one of the additional lines.

The first set of devices and second set of devices may concurrently monitor at least one of the first line and second line in both the first mode and second mode of operation. The first set of devices and second set of devices concurrently monitor both the first line and second line in both the first mode and second mode of operation.

In one example of operation in the first mode of operation, a master device in the second set of devices transmits data to a slave device in the first set of devices or the second set of devices over the first line of the bus. The first mode of operation may implement a first protocol for data transmissions over the bus and the second mode of operation implements a second protocol for data transmissions over the bus and the at least one of the additional lines. In the first mode of operation, a master node in the second set of devices may send a first bit sequence over the first line indicating to the second set of devices a switch to the second mode of operation.

In one example of operation in the second mode of operation, a master device of the second set of devices transmits data to a slave device in the second set of devices over the first line and second line of the bus and the at least one of the additional lines. In the second mode of operation, the first set of devices may receive a reset indicator over the first line and second line inhibiting detection of a valid slave node address. In the second mode of operation, a reset indicator and/or stop indicator may be avoided in the first line and/or second line during data transmissions. In the second mode of operation, a master node may send an exit symbol sequence over the bus indicating to the second set of devices a switch to the first mode of operation.

According to certain aspects, in the second mode of operation a second clock signal is embedded within symbol transitions over the bus and the at least one of the additional lines. The second clock signal may be embedded within symbol transitions over a first subset of lines while a third clock signal is embedded within symbol transitions over a second subset of lines. In the second mode of operation, a master device within the second set of devices may be adapted to ascertain a number of available lines with a particular slave device within the second set of devices, select one or more of the available lines, and dynamically adapt a protocol used in the second mode of operation to utilize the bus and the selected one or more available lines.

According to certain aspects, the protocol is adapted to use a varying number of lines to encode symbols for transmission.

In some instances, one or more devices in the second set of devices are capable of operating in both the first mode of operation and the second mode of operation.

According to certain aspects, in the first mode of operation the one or more additional lines may be provided for communicating interrupts from slave devices to a master device within the first and/or second set of devices.

According to certain aspects, at least three lines are used in the second mode of operation to encode the symbols, and a plurality of symbols are further encoded as a septenary-based number. At least four lines may be used in the second mode of operation to encode the symbols, and a plurality of symbols may be further encoded as a pentadecimal-based number.

In some examples, the bus is an I2C-compatible bus.

In an aspect of the disclosure, a device includes a two-wire bus having a first line and a second line, means for determining availability of one or more additional lines that are configurable for data communications between the first device and the second device, means for encoding data, according to a high data rate protocol, in sequences of symbols for transmission over a combination of lines that includes the two-wire bus and the one or more additional lines, where clock information is encoded in transitions between pairs of consecutive symbols in the sequences of symbols, and means for transmitting the sequences of symbols over the combination of lines.

In an aspect of the disclosure, a computer-readable medium may store data and instructions. The computer-readable medium may be a non-transitory storage medium. The instructions may be executable by one or more processors of a processing circuit. The instructions, when executed, may cause the processing circuit to determine availability of one or more additional lines that are configurable for data communications between the first device and the second device, encode data according to a high data rate protocol in sequences of symbols for transmission over a combination of lines that includes the two-wire bus and the one or more additional lines, where clock information is encoded in transitions between pairs of consecutive symbols in the sequences of symbols, and transmit the sequences of symbols over the combination of lines.

In an aspect of the disclosure, a method includes operating a first set of devices according to a first mode of operation configured to use a first line of a bus for data transmissions and use a second line of the bus for a first clock signal, determining availability of one or more additional lines connecting two or more of the devices in the first set of devices for transmitting signaling between the two or more devices, operating a second set of devices, within the first set of devices, according to a second mode of operation configured to use the bus and at least one of the additional lines for data transmissions. In the second mode of operation, symbols may be encoded across the first line, the second line, and the at least one of the additional lines.

In an aspect of the disclosure, first device may include a communication interface configured to couple the first device to a two-wire serial bus with a second device coupled to the two-wire serial bus using a predefined base protocol associated with the two-wire serial bus, a processing circuit coupled to the communication interface.

The processing circuit may be configured to determine availability of one or more additional lines that are configurable for data communications between the first device and the second device, encode data according to a high data rate protocol in sequences of symbols for transmission over a combination of lines that includes the two-wire bus and the one or more additional lines. Clock information is encoded in transitions between pairs of consecutive symbols in the sequences of symbols, and transmit the sequences of symbols over the combination of lines.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

A dynamically reconfigurable high data rate bus (e.g., sensors global bus or SGbus) is provided that uses a two-wire I2C-compatible bus in addition to dynamically repurposing one or more other wires that may be available between one or more devices that are also coupled to the two-wire I2C-compatible bus. Symbols are then encoded across the two-wire bus and the repurposed one or more other wires. This sensor global bus may support legacy I2C devices in a first mode of operation as well as next-generation devices in a second mode of operation.

Exemplary Operating Environment

Figure 1:
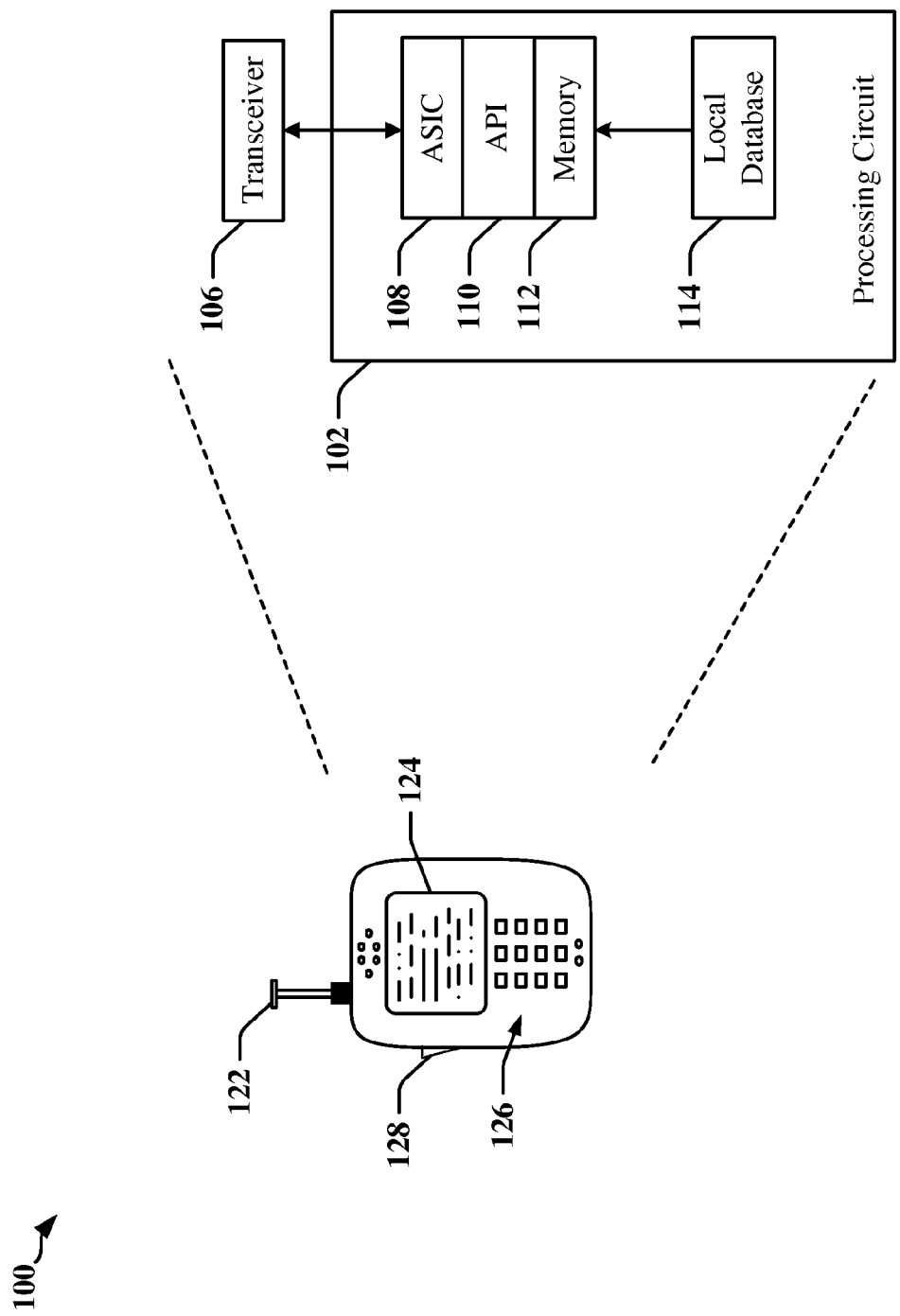
FIG. 1 depicts an apparatus employing a data link between integrated circuit (IC) devices that selectively operates according to one of plurality of available standards.

Certain aspects may be applicable to communications links deployed between electronic devices that may include subcomponents of an apparatus such as a telephone, a mobile computing device, an appliance, automobile electronics, avionics systems, etc. FIG. 1 depicts an apparatus that may employ a communication link between IC devices. In one example, the apparatus 100 may include a wireless communication device that communicates through a radio frequency (RF) transceiver with a radio access network (RAN), a core access network, the Internet and/or another network. The apparatus 100 may include a communications transceiver 106 operably coupled to processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory device 112 that may maintain instructions and data that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit may also be operably coupled to external devices such as antenna 122, display 124, operator controls, such as button 128 and keypad 126 among other components.

Figure 2:
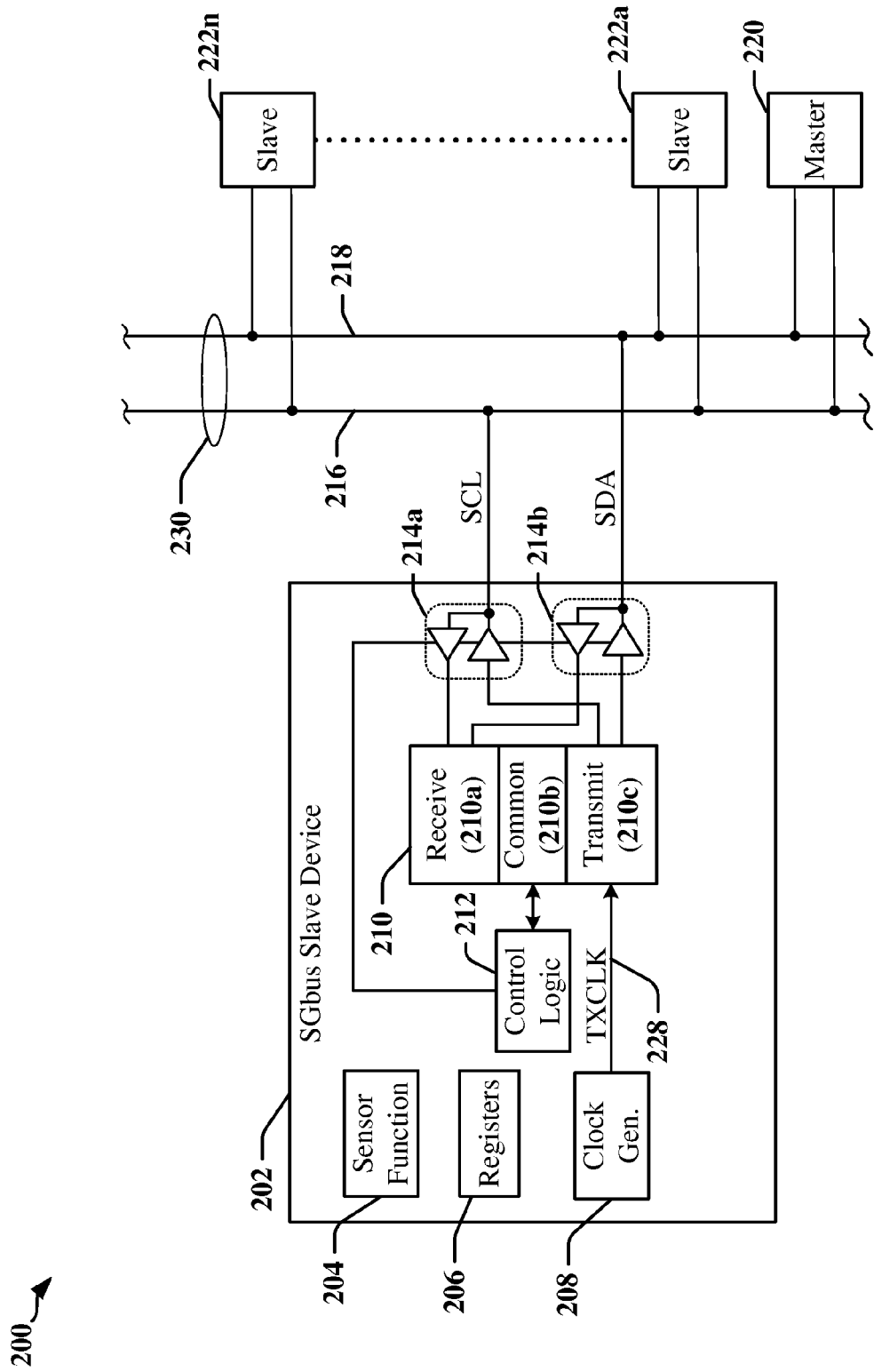
FIG. 2 illustrates a system architecture for an apparatus employing a data link between IC devices.

FIG. 2 is a block schematic illustrating certain aspects of an apparatus 200 connected to a communications bus, where the apparatus may be embodied in one or more of a wireless mobile device, a mobile telephone, a mobile computing system, a wireless telephone, a notebook computer, a tablet computing device, a media player, a gaming device, a personal digital assistants (PDA) or other handheld device, a netbook, a notebook computer, a television, an entertainment device, a wearable device, or the like. The apparatus 200 may include multiple devices 202, 210 and 222a-222n, which communicate using a shared bus 230. The shared bus 230 may extend the capabilities of a conventional I2C bus for devices that are configured for enhanced features supported by the high data rate bus 230. For example, the shared bus 230 may support a higher bit rate than an I2C bus by utilizing ternary number symbol coding over two wires/lines.

In the example illustrated in FIG. 2, a device 202 may be configured to operate as a slave on the shared bus 230. The device 202 may be adapted to provide a sensor control function 204 that manages one or more generic sensors, high speed sensors, fingerprint sensors, image sensors (e.g. cameras), touchscreen sensors, and so on. In addition, the device 202 may include configuration registers or other storage 206, control logic 212, a transceiver 210 and line drivers/receivers 214a and 214b. The control logic 212 may include a processing circuit such as a state machine, sequencer, signal processor or general-purpose processor. The transceiver 210 may include a receiver 210a, a transmitter 210c and common circuits 210b, including timing, logic and storage circuits and/or devices. In one example, the transmitter 210c encodes and transmits data based on timing provided by a clock generation circuit 208.

Exemplary Two-Wire Symbol-Encoding Protocol

Figure 3:
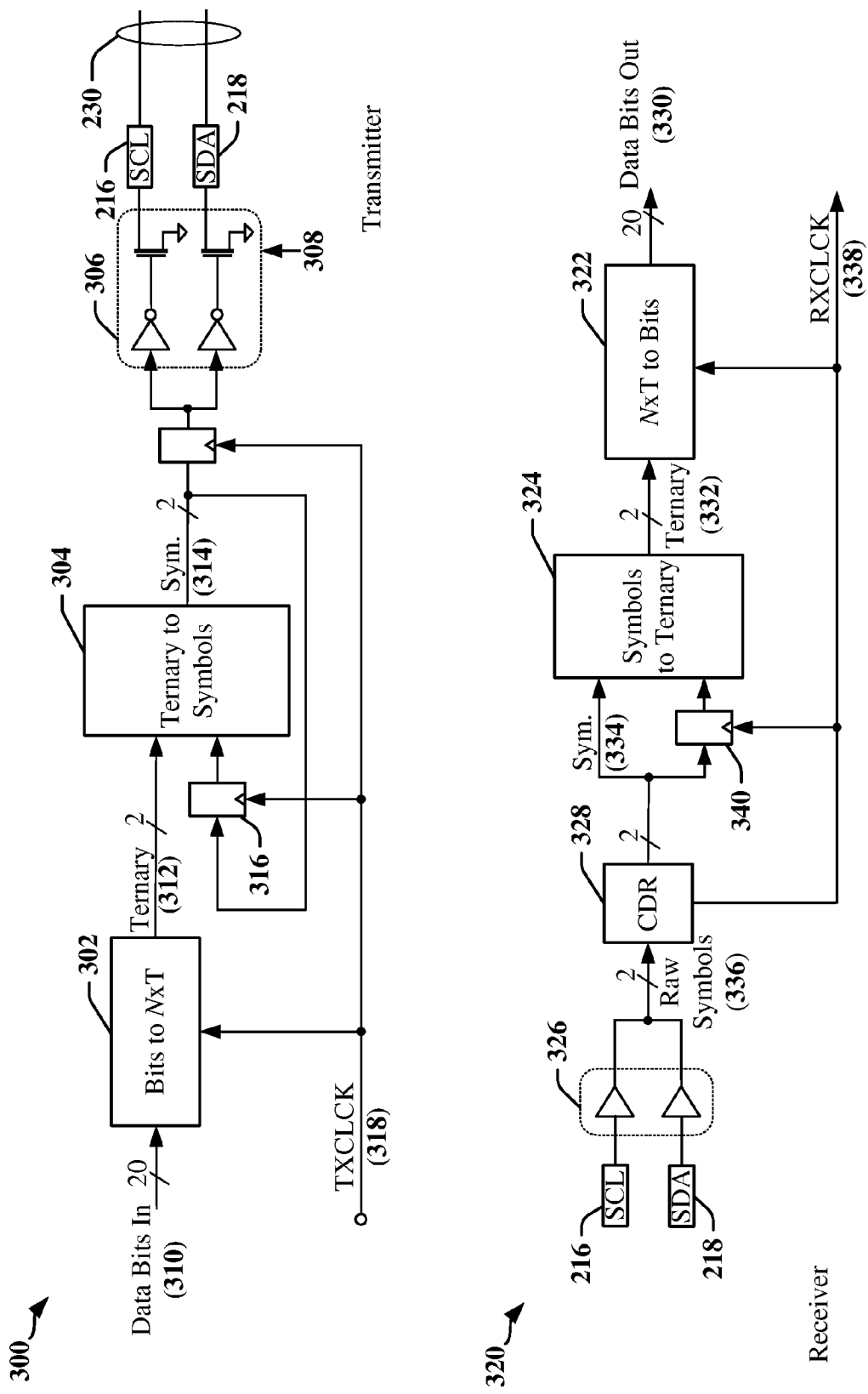
FIG. 3 illustrates certain aspects of a transmitter and a receiver according to certain aspects disclosed herein.

FIG. 3 is a block diagram illustrating an example of a transmitter 300 and a receiver 320 configured according to certain aspects disclosed herein. For HDR operations, the transmitter 300 may transcode data 310 into ternary (base-3) numbers that are encoded as symbols transmitted on a pair of connectors, wires or line such as the SCL line 216 and SDA line 218 signal wires. In the example depicted, each data element (also referred to as a data word) of the input data 310 may have a predefined number of bits, such as 8, 12, 16, 19 or 20 bits. A transcoder 302 may receive the input data 310 and produce a sequence of ternary numbers 312 for each data element. Each ternary number in the sequence of ternary numbers 312 may be encoded in two bits and there may be 12 ternary numbers in each sequence of ternary numbers 312. A ternary-to-symbols encoder 304 produces a stream of 2-bit symbols 314 that are transmitted through line drivers 306. In the example depicted, the line drivers 306 include open-drain output transistors 308. However, in other examples, the line drivers 306 may drive the SCL line 216 and SDA line 218 signal wires using push-pull drivers. The output stream of 2-bit symbols 314 generated by the encoder has a transition in the state of at least one of the SCL line 216 and SDA line 218 signal wires between consecutive symbols 314 by ensuring that no pair of consecutive symbols includes two identical symbols. The availability of a transition of state in at least one line 216 and/or 218 permits a receiver 320 to extract a receive clock 338 from the stream of data symbols 314.

In a high data rate interface, the receiver 320 may include or cooperate with a clock and data recovery (CDR) circuit 328. The receiver 320 may include line interface circuits 326 that provide a stream of raw 2-bit symbols 336 to the CDR circuit 328. The CDR circuit 328 extracts a receive clock 338 from the raw symbols 336 and provides a stream of 2-bit symbols 334 and the receive clock 338 to other circuits 324 and 322 of the receiver 320. In some examples, the CDR circuit 328 may produce multiple clocks 338. A symbols-to-ternary decoder 324 may use the receive clock 338 to decode the stream of symbols 334 into sequences of 12 ternary numbers 332. The ternary numbers 332 may be encoded using two bits. A transcoder 322 may then convert each sequence of 12 ternary numbers 332 into 8, 12, 16, 19 or 20 bit output data elements 330.

Figure 4:
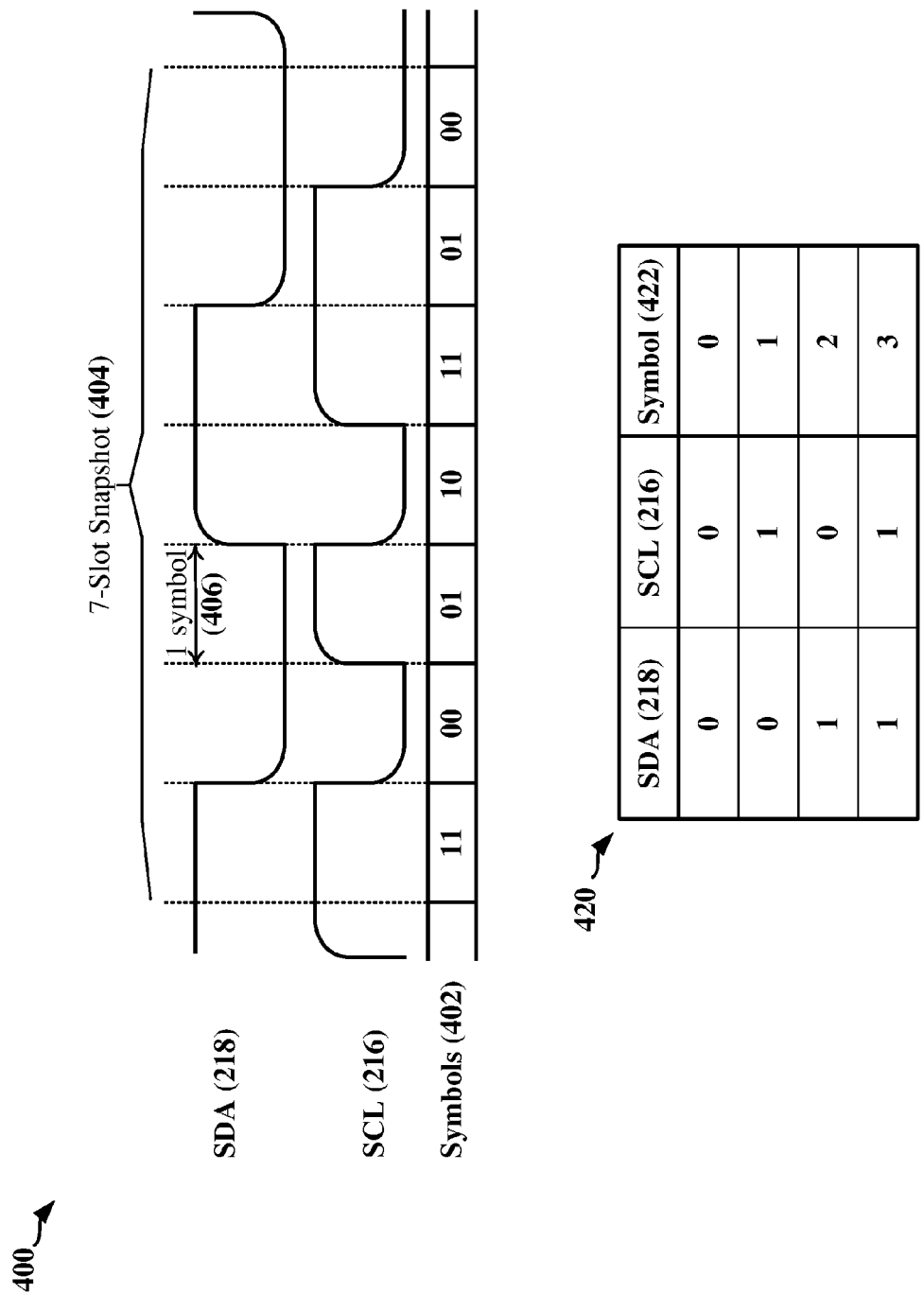
FIG. 4 illustrates the signaling state of a high data rate protocol (e.g., an SGbus protocol) when transmitting symbols according to certain aspects disclosed herein.

FIG. 4 includes a timing diagram 400 illustrating the signaling state of the shared bus 230 when transmitting a sequence of symbols according to certain aspects disclosed herein. In the example depicted, both the SDA line 218 and the SCL line 216 are used to encode data. Raw symbol values 402 cause line driving circuits to drive each of the SDA line 218 and SCL line 216 to voltage levels determined by one bit of the current symbol value 402. In the example, a symbol bit that is set to "binary 1" causes a corresponding one of the SDA line 218 and SCL line 216 to a more positive voltage level, while a symbol bit that is set to "binary 0" causes a corresponding one of the SDA line 218 and SCL line 216 to a more negative voltage level. FIG. 4 provides a table showing the four possible signaling states for symbols 422 when each of the SDA line 218 and SCL line 216 can be at one of two voltage levels. A data element having K bits may be encoded in a sequence of L symbols. The values of K and L may be determined based on encoding scheme, word size and configuration and other application parameters, including latency, etc. The timing diagram 400 illustrates an extract or snapshot of a symbol transmission sequence that includes 7 slots 404, where a symbol 406 may be transmitted in each of the slots 404. The 7 slots illustrated may be part of a larger symbol sequence such as a 12-symbol sequence that encodes a 16-bit word, or may include two or more sequences of symbols (e.g., 2, 3 . . . or 6 symbol examples, for example).

According to certain aspects disclosed herein, a transmitter 300 may be configured or adapted to ensure that the same symbol is not transmitted in any two consecutive slots in a sequence of slots 404. Accordingly, at least one of the SDA line 218 and SCL line 216 changes signaling state at each boundary between consecutive symbols. The toggling of either of the SDA line 218 and the SCL line 216 marks the beginning of a new symbol.

Figure 5:
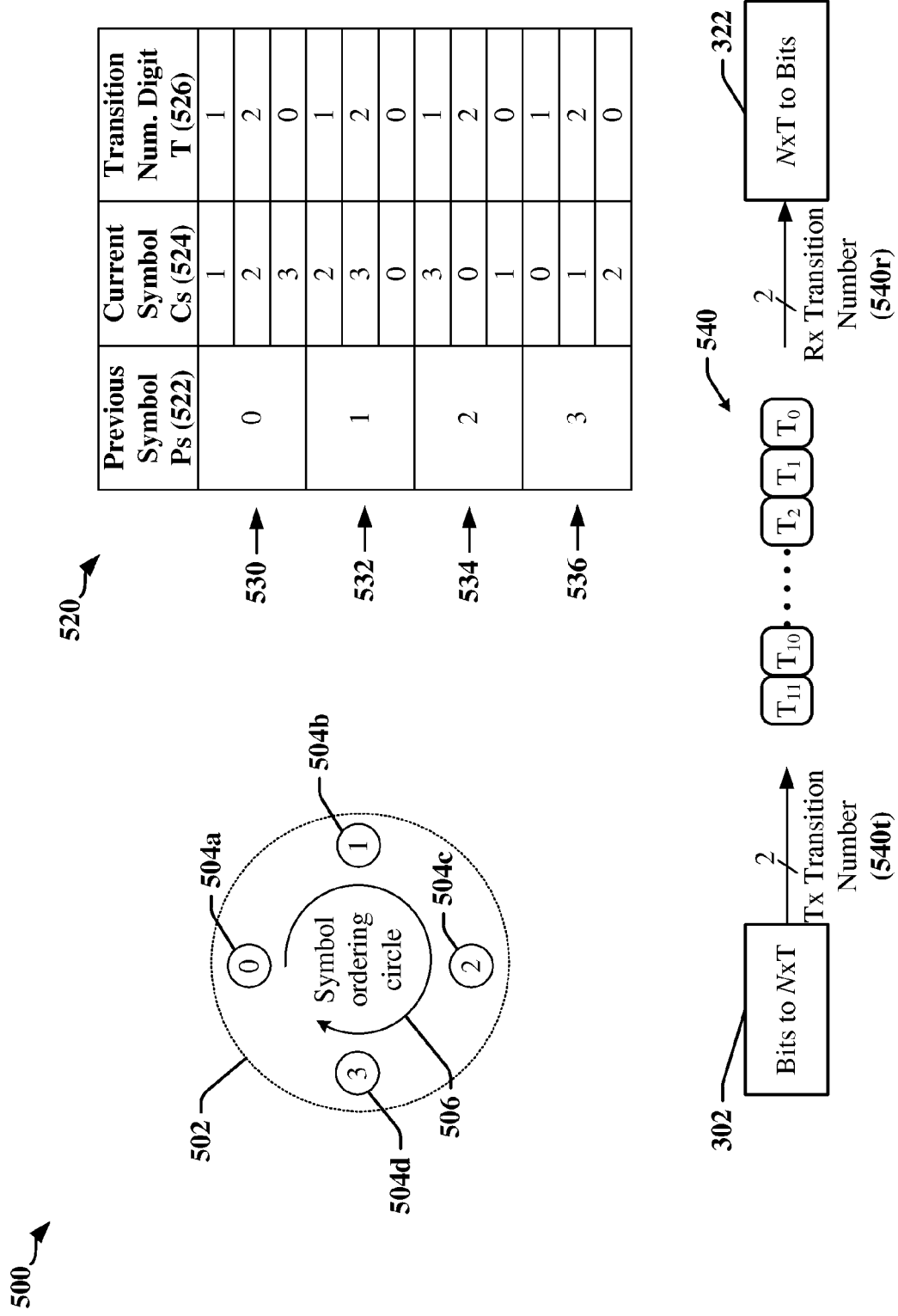
FIG. 5 illustrates one example of an encoding scheme for transcoding data according to certain aspects disclosed herein.

FIG. 5 is a drawing illustrating one example of an encoding scheme 500 that may be used by the ternary-to-symbols encoder 304 to produce a sequence of symbols 314 with an embedded clock for transmission on the shared bus 230. The encoding scheme 500 may also be used by a symbols-to-ternary decoder 324 to extract ternary transition numbers from symbols received from the shared bus 230. In this encoding scheme 500, the two wires of the shared bus 230 permit definition of 4 basic symbols S: {0, 1, 2, 3}. Any two consecutive symbols in the sequence of symbols 314, 334 have different states, and the symbol sequences 0,0, 1,1, 2,2 and 3,3 are invalid combinations of consecutive symbols. Accordingly, only 3 valid symbol transitions are available at each symbol boundary, where the symbol boundary is determined by the transmit clock and represents the point at which a first symbol (previous symbol Ps) 522 terminates and a second symbol (current symbol Cs) 524 begins.

According to certain aspects disclosed herein, the three available transitions are assigned a transition number digit (T) 526 for each Ps symbol 522. The value of T 526 can be represented by a ternary number. In one example, the value of a transition number digit 526 may be determined by assigning a symbol-ordering circle 502 for the encoding scheme. The symbol-ordering circle 502 allocates locations 504a-504d on the circle 502 for the four possible symbols, and a direction of rotation 506 between the locations 504a-504d. In the depicted example, the direction of rotation 506 is clockwise. The transition number digit 526 may represent the separation between the valid current symbols 524 and the immediately preceding symbol 522. Separation may be defined as the number of steps along the direction of rotation 506 on the symbol-ordering circle 502 required to reach the current symbol Cs 524 from the previous symbol 522. The number of steps can be expressed as a single digit base-3 number. It will be appreciated that a three-step difference between symbols can be represented as a $0_{base-3}$. The table 520 in FIG. 5 summarizes an encoding scheme employing this approach.

At the transmitter 300, the table 520 may be used to lookup a current symbol 524 to be transmitted, given knowledge of the previously generated symbol 522 and an input ternary number, which is used as a transition number digit 526. At the receiver 320, the table 520 may be used as a lookup to determine a transition number digit 526 that represents the transition between the previously received symbol 522 and the currently received symbol 524.

According to certain aspects, a transition number 540 may be formed from a plurality of transition number digits 526, each digit 526 being usable to determine a next symbol given a current symbol. In one example, the transition number 540 is a ternary number that includes 12 ternary digits 526. In the general case, a transition number 540 having N digits (Ts) 526 with r possible transitions for each T 526 has a total of $r^N$ states. In the example of a 12 digit transition number 540, there are a total of r=4−1=3 possible transitions for each of the N=12 digits 526, providing a total of $3^{12}$=531441 different states. Consequently, the 12 digit transition number 540 can encode 19-bit binary numbers which require 524288 states. The remaining 7153 states may be used to carry control codes, or the like.

A plurality of next-generation devices may coexist on the same shared bus 230 with one or more legacy I2C devices. Accordingly, the high data rate protocol defines signaling schemes that can be ignored, undetected or otherwise disregarded by legacy I2C devices. The SGbus devices may transmit control information in signaling that is consistent with I2C mode signaling, and may transmit the data payload encoded according to ternary coding-based protocols to obtain faster transmission speeds. The next-generation devices may use other encoding modes for transmitting the data payload, including legacy I2C modes.

Figure 6:
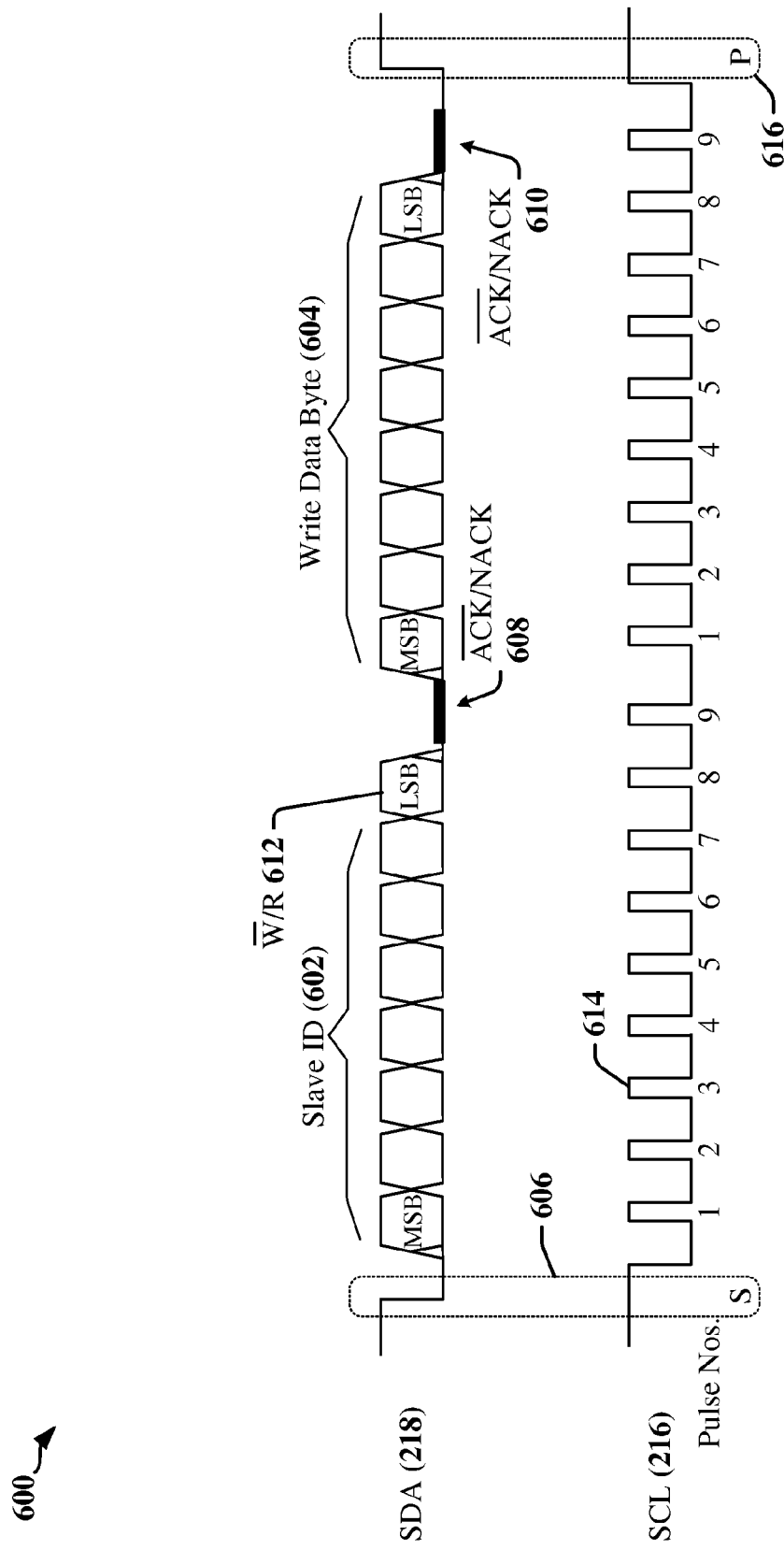
FIG. 6 illustrates a timing diagram of an I2C one byte write data operation.

FIG. 6 is a timing diagram 600 illustrating an I2C one-byte write data operation. A transmission is initiated when a master node provides an I2C START condition 606 by driving the SDA line 218 low while the SCL line 216 remains high. An I2C master node sends a 7-bit slave ID 602 on the SDA line 218 to indicate which slave node on the I2C bus the master node wishes to access, followed by a Read/Write bit 612 that indicates whether the operation is a read or a write operation, whereby the Read/Write bit 612 is at logic 0 to indicate a write operation and at logic 1 to indicate a read operation. Only the slave node whose ID matches with the 7-bit slave ID 602 can respond to the write (or other) operation. In order for an I2C slave node to detect its own slave ID 602, the master node transmits at least 8-bits on the SDA line 218, together with 8 clock pulses on the SCL line 216. The master node provides a STOP condition 616 to terminate the transaction by driving the SDA line 218 high while the SCL line 216 remains high. The I2C interface is considered to be in a "Bus-Busy" state after an I2C START condition 606 and in a "Bus-Free" state after an I2C STOP condition 616. This behavior may be exploited to transmit data in high data rate operating modes in order to prevent legacy I2C slave nodes from reacting to high data rate operations.

High data rate communications may use the combination of the SCL line 216 and the SDA line 218 of an I2C bus in addition to one or more other available lines between devices for data transmission. Symbols may be encoded across the two-wire I2C bus and one or more other available lines. A symbol may be transmitted at a time corresponding to each toggle of a clock signal pulse 614 transmitted on the SCL line 216 for an I2C transmission. The number of clock toggles transmitted in each frame transmission period may therefore define the number of symbols that may be transmitted for each transmission period. In one example, the number of symbols transmitted in each frame transmission period may depend on the technique used to facilitate coexistence between legacy I2C devices and next-generation devices (i.e., devices that have a higher throughput than legacy I2C devices). In one example, the coexistence scheme may be based on the I2C "Bus-Busy" condition. The I2C bus is considered busy after an I2C START condition until the I2C STOP condition. After the STOP condition, the I2C bus switches back to a "Bus-Idle" or "Bus-Free" condition. In order to keep the bus busy during SGbus transmissions, unintentional I2C RESTART and STOP conditions are avoided. This means that no SDA transitions are allowed, for as long the SCL line (of the I2C bus) is HIGH. To achieve this, the high data rate protocol implements "dummy translations"; meaning after each symbol that has the SCL line (of the I2C bus) HIGH, there is a dummy symbol that has the SCL line LOW, not changing the SDA line logic state. As a result, there is no possibility of having an unwanted I2C RESTART or STOP condition while within the HDR mode (e.g., while high data rate transmissions occur).

The SCL line 216 and/or the SDA line 218 of an I2C bus may be utilized for data transmission in high data rate mode when a clock signal has been embedded within symbol transitions. Consequently, the SDA line 218 and SCL line 216 can be used to transmit any arbitrary 12 symbols without affecting legacy I2C slave node functionality and without using a bridge device to segregate legacy I2C slave nodes from the high data rate-capable nodes. In I2C mode, a START condition 606 may be provided only by an I2C master. In high data rate mode a START condition 606 is provided by whichever node is going to transmit a 12-symbol word.

The high data rate protocol illustrated in FIGS. 2-6 reuses an existing two-wire bus encode symbols across the two wires and embed a clock within symbol transitions. This concept may be expanded to additional wires/lines to further improve data throughput. For example, additional wires that may be used for interrupts between I2C devices may be repurposed for data transmissions by the high data rate protocol. Consequently, in addition to the two-wire bus, one or more additional wires/lines may be used during high data rate mode/protocol to increase throughput. Similarly to the symbol encoding illustrated in FIGS. 3-5, symbols may be encoded across the three or more lines in other high data rate modes/protocols when additional lines are available.

Exemplary Sensor Global Bus

One example of dynamically configuring a two-wire bus and one or more additional lines as a high data rate bus may be implemented for sensor devices and may be referred to as a "sensor global bus" (SGbus). Symbol coding using 3 wires/lines may be based on septenary numbers (base 7 numbers). Similarly, symbol coding using 4 wires/lines may be based on pentadecimrnal numbers (base 15 numbers). Different number bases may be used for more than 4 wires/lines.

Figure 7:
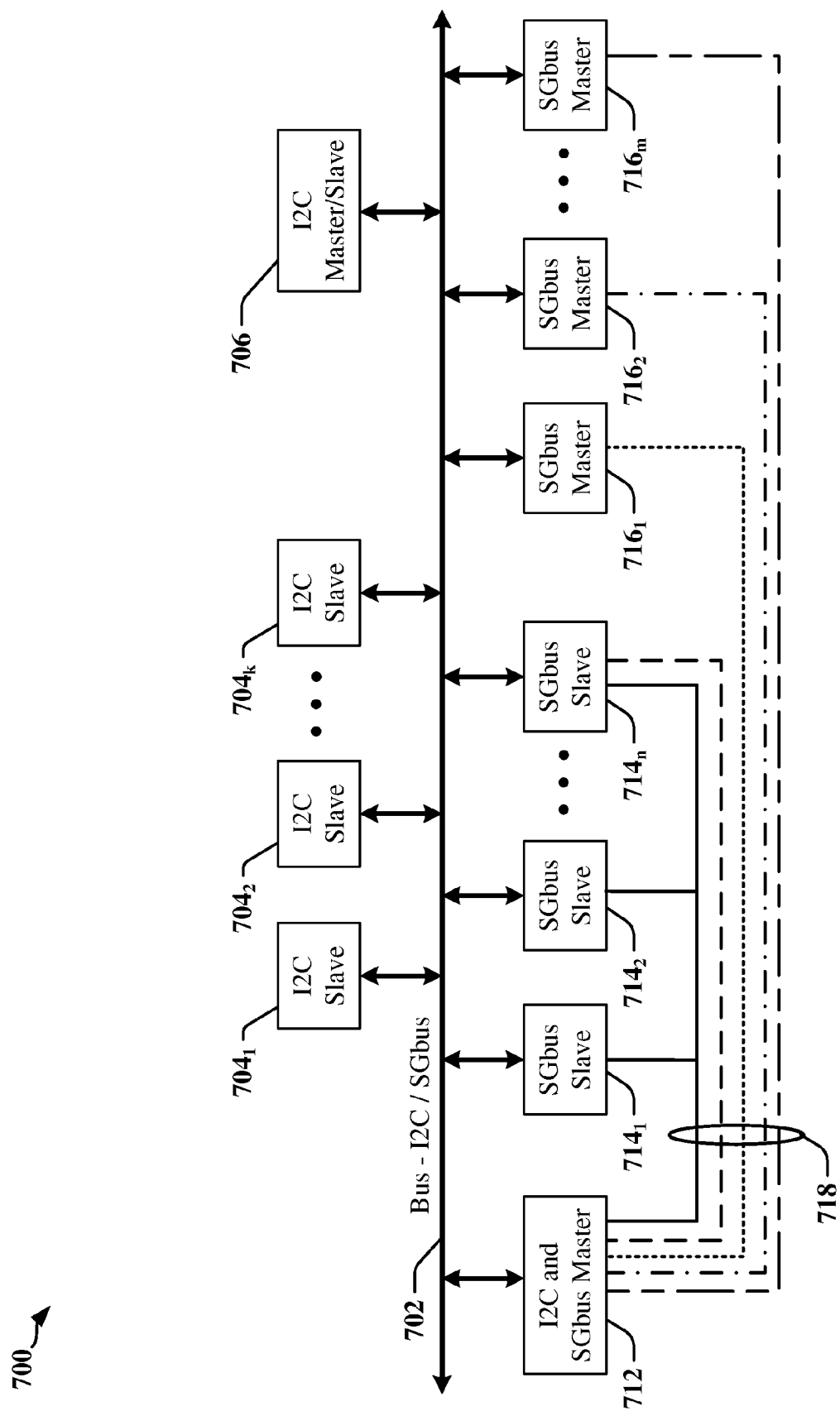
FIG. 7 illustrates a configuration of I2C devices (e.g., legacy devices) and SGbus devices (e.g., next generation sensors) connected to a common I2C bus.

FIG. 7 illustrates a configuration in which a shared bus 702 (e.g., I2C bus/SGbus) couples I2C devices $704_1$-$704_k$, 706 and SGbus devices 712, $714_1$-$714_n$ and $716_1$-$716_m$. The SGbus devices 712, $714_1$-$714_n$ and $716_1$-$716_m$ may coexist with conventionally configured I2C devices $704_1$-$704_k$, 706, and certain of the SGbus devices 712, $714_1$-$714_n$ and $716_1$-$716_m$ may communicate using conventional I2C protocols, as desired or needed. The shared bus 702 may be a two-wire bus that may operate according to multiple modes, e.g., an I2C mode and an HDR mode. One example of such HDR mode, symbol coding is implemented across the two-wire bus and one or more repurposed additional wires/lines 718. Such HDR mode may coexist with the I2C mode over the shared bus such that legacy devices (e.g., I2C-compatible devices) and next-generation devices (e.g., SGbus-compatible devices) can share the shared bus 702.

Data transfer on the shared bus 702, including configuration and other bus control messages, may be initiated and performed using modified versions of an I2C protocol or a variant of the I2C protocol. In one example, all transactions may be initiated using conventional I2C protocols to start the transaction.

Figure 8:
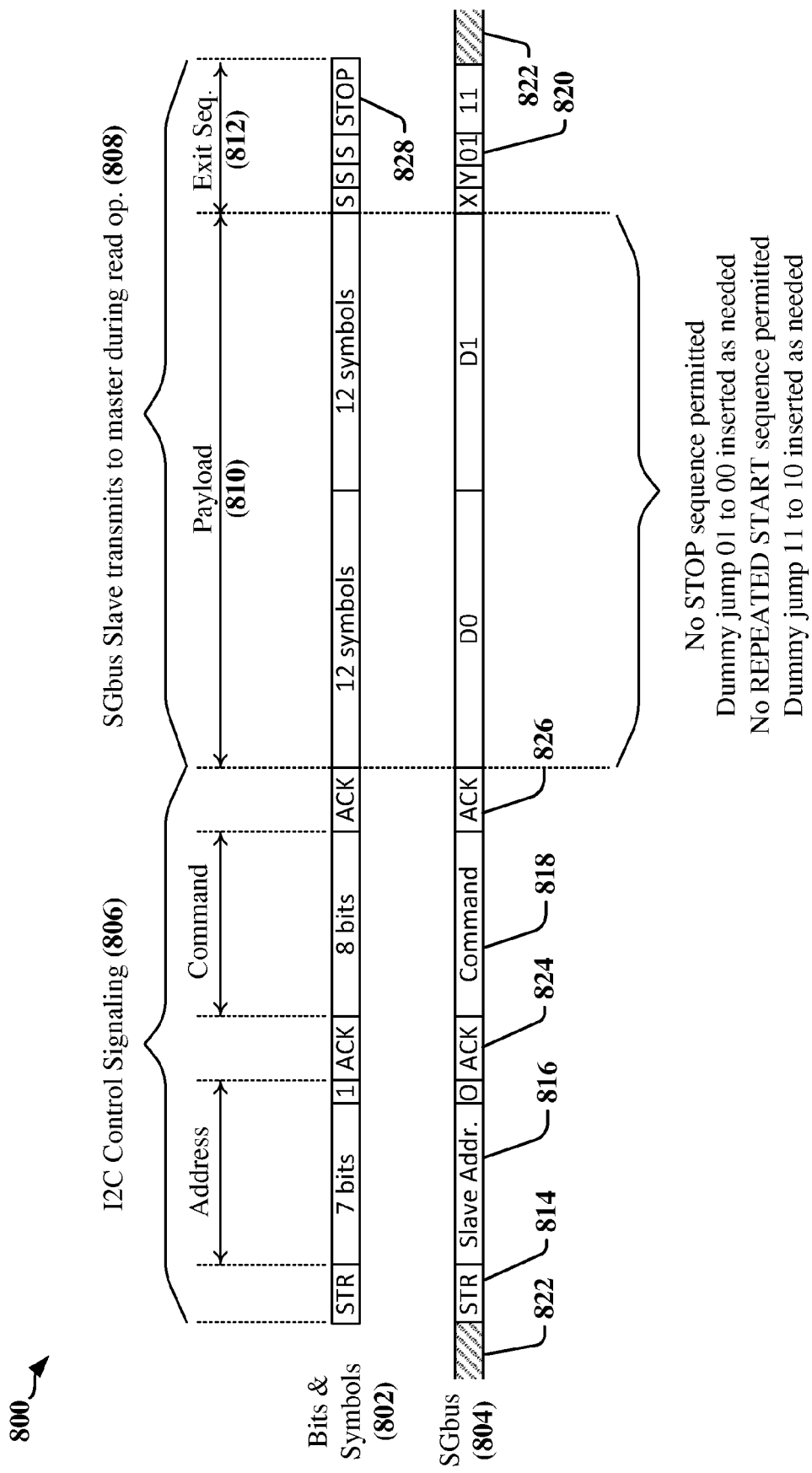
FIG. 8 illustrates the initiation and termination of transactions on the SGbus serial interface.

FIG. 8 illustrates a transaction 800 on the shared bus 702, in terms of bits and symbols 802 provided to encoding logic and resultant signaling 804 on the shared bus 702 when operated according to certain aspects of the SGbus protocols described herein. Initially, the bus 702 may be in a "Bus-Free" state 822, and control signaling 806 is handled in accordance with I2C protocols. After the control signaling 806 is acknowledged 824, 826, an SGbus data exchange 808 may occur, during which a data payload 810 is transmitted to the SGbus master device 712. An exit sequence 812 provides a transition from signaling (including data payload 810) according to SGbus protocols to signaling recognized as a STOP condition 820 consistent with I2C protocols. A Bus-Free state 822 may then result.

In the example depicted, a transaction 800 on the shared bus 702 may be initiated by an I2C START condition 814 (see also START condition 606 of FIG. 6) that precedes an address 816 (see I2C slave ID 602, for example) followed by a succession of command codes 818. The command codes 818 may have a variable length that may include a number of bytes predefined by a communication protocol used for the SGbus 702.

In one example, a command code 818 may be transmitted to define a selected data transfer protocol and/or certain characteristics of the data transfer protocol. The command code 818 may identify one of a plurality of available data transfer protocols to be used for subsequent data transfers. The identified data transfer protocol may control transactions until a different data transfer protocol command is inserted on the bus.

After the START condition 814 the bus 702 is considered busy until the next STOP condition 820, 828. A Bus-Free state 822 may be defined as occurring when the SCL line 216 and SDA line 218 are in a logic high state for a predetermined period of time. The busy/free status of the bus 702 is defined by START conditions 606, 814 and STOP conditions 616, 820. The Bus-Free state 822 has a duration that includes the period of time after a STOP condition 616, 820, during which the SCL line 216 and SDA line 218 are in a logic high state, regardless of whether data is transferred using SGbus or I2C-compatible protocols. In one example, the period of time during which the SCL line 216 and SDA line 218 are in a logic high state may be set to be double the period of the slowest clock used on the bus 702. For example, in I2C fast mode, the clock signal transmitted on the SCL line 216 has a frequency of at least 400 kHz, with a clock period of 2.5 μs and a 5 μs period may suffice to indicate the Bus-Free state 822.

As shown in FIG. 7, the shared bus 702 may support a legacy I2C devices, such as master device 706, legacy I2C slave devices $704_1$-$704_k$, and next-generation devices, such as a primary SGbus master device 712, SGbus slave devices $714_1$-$714_n$ and SGbus secondary master devices $716_1$-$716_m$. The primary SGbus master device 712 may be preconfigured with certain operational information related to the legacy I2C devices 706, $704_1$-$704_k$ resident on the bus 702. The primary SGbus master device 712 may include non-volatile memory in which operational and other information may be preconfigured and/or updated in response to communications received from an application host device. According to one example, legacy I2C devices may use a first wire of the two-wire shared bus 702 for serial data transmission and a second wire of the two-wire bus 702 for a clock signal. Similarly, next-generation devices (e.g., SGbus devices) may communicate data across the two-wire bus 702 and one or more repurposed additional wires/lines 718 by using coded symbols across the two-wire bus 702 and one or more repurposed additional wires/lines. In the example where two wires/lines were used, symbols may be encoded across the two wires/lines using a ternary number (base 3 numbers). Where three wires/lines are used, symbols may be encoded across the three wires/lines using a septenary number (base 7 numbers). Where four wires/lines are used, symbols may be encoded across the four wires/lines using a pentadecimal number (base 15 numbers). As more wires/lines are used for symbol transmissions, numbers of other or higher bases may be utilized for symbol encoding.

Each of the secondary SGbus master devices $716_1$-$716_m$ and the SGbus slave devices $714_1$-$714_n$ may be configured to internally generate a random address. The SGbus slave devices $714_1$-$714_n$, $716_1$-$716_m$ may be capable of generating an interrupt or causing an interrupt to occur using a reserved address, such that an SGbus master device 712, $716_1$-$716_m$ may recognize the existence of one or more SGbus slave devices $714_1$-$714_n$, $716_1$-$716_m$ that do not have local addresses assigned. The SGbus master device 712, $716_1$-

$716_m$ may perform a configuration process using random addresses to distinguish between the SGbus slave devices $714_1$-$714_n$, $716_1$-$716_m$ that do not have local addresses assigned, where the configuration process involves assigning local addresses to SGbus slave devices $714_1$-$714_n$, $716_1$-$716_m$. The random addresses may be formed using a number large enough to significantly decrease the probability that two SGbus slave devices $714_1$-$714_n$, $716_1$-$716_m$, resident on the bus 702 would generate the same random address for any given configuration process. In the event that two or more SGbus slave devices $714_1$-$714_n$, $716_1$-$716_m$ generate the same random address, then such devices may receive the same local address from the SGbus master device 712, $716_1$-$716_m$, and the resulting conflicts may require reassignment of local addresses by reconfiguration using new random addresses. In one example, SGbus slave devices $714_1$-$714_n$, $716_1$-$716_m$ may generate a 48-bit pseudo-random number to serve as the random address used during configuration. Other bit-widths for the pseudo-random number may be used in some instances. A number of suitable width may be employed to minimize the possibility of the apparition of the same random address on two SGbus slave devices $714_1$-$714_n$, $716_1$-$716_m$.

In operation, the primary SGbus master device 712 may transmit a "general call" code followed by a Dynamic Address Allocation command code. The primary SGbus master device 712 may then drive a clock signal on the SCL line 216 of the bus 702 while releasing the SDA line 218, which may be pulled to a logic high level. An arbitration process follows, whereby the SGbus devices $714_1$-$714_n$, $716_1$-$716_m$ drive the SDA line 218 in accordance with their corresponding randomly-selected 48-bit address. The SGbus device $714_1$-$714_n$, $716_1$-$716_m$ with the lowest address wins the arbitration, in a similar fashion as specified by I2C protocol.

The primary SGbus master device 712 continues to drive a clock signal on the SCL line 216 with the SDA line 218 released. The winning device from among the SGbus devices $714_1$-$714_n$, $716_1$-$716_m$ may then transfer one or more characteristic byte. The characteristic byte includes information identifying certain characteristics of the winning device, including whether the device functions as a slave device only, type of device (e.g. accelerometer), data width (e.g. 16 or 12 bits wide), and other characteristics.

The primary SGbus master device 712 may transfer a 7-bit wide local address for the winning device. This address incorporates the priority level that the primary SGbus master device 712 assigns to the identified device. The primary SGbus master device 712 may repeat this procedure until it receives no response from a device seeking address arbitration. The primary SGbus master device 712 may terminate the arbitration procedure by sending a specific command code that terminates the Dynamic Address Allocation command code that enabled entry into the procedure.

A secondary SGbus master device $716_1$-$716_m$ connected to the shared bus 702 may monitor the arbitration process and capture the information exchange during the process, such that the secondary SGbus master device $716_1$-$716_m$ has a copy of the addressing, priority and configuration information for the bus 702. Nevertheless, the primary SGbus master device 712 may transfer information received from the SGbus slave devices $714_1$-$714_n$ to the secondary SGbus master device $716_1$-$716_m$.

Each of the SGbus devices $714_1$-$714_n$, $716_1$-$716_m$ may have one or more retaining registers that may be used for storing dynamic addresses, such that the SGbus configuration shall take place only after a cold power-up. If two SGbus devices $714_1$-$714_n$ and/or $716_1$-$716_m$ select the same random 48-bit address, and have the same characteristic byte, the two devices may store the same local address. The double assignment may remain in effect until the SGbus master device 712 requires a data transfer and the data transmitted concurrently by the two different two SGbus slave devices $714_1$-$714_n$ is different. At least one of the two SGbus slave devices $714_1$-$714_n$ may recognize that it has the same address as another SGbus slave device $714_1$-$714_n$ connected to the bus 702 and may drop off the bus 702. At the next Bus-Free state 822, the dropped-off SGbus slave device $714_1$-$714_n$ may request a new local address, using the dedicated control code for this requirement.

Each of the SGbus devices $714_1$-$714_n$ and/or $716_1$-$716_m$ is assigned a priority ranking by the primary SGbus master device 712. The priority rank is defined by the SGbus master device 712 using the level of the dynamically allocated local address, whereby lower address values have higher priority ranks.

Each of the SGbus devices $714_1$-$714_n$, $716_1$-$716_m$ can assert an in-band Interrupt Request (IRQ) at any time during the "Bus Free" state. The IRQ assertion procedure corresponds to similar procedures used for bus arbitration in I2C and other I2C-related interfaces. In accordance with certain aspects disclosed herein, however, certain refinements and enhancements may be employed for IRQ procedures.

In one example, an SGbus slave device $714_1$-$714_n$ can assert an in-band IRQ by pulling the SDA line 218 to a logic low signaling state. The primary SGbus master device 712 may start driving a clock signal on the SCL line 216, while leaving the SDA line 218 undriven. The SDA line 218 may be pulled toward the logic high signaling state. The SGbus slave device $714_1$-$714_n$ may drive the SDA line 218 in order to transmit its own address. The primary SGbus master device 712 acknowledges the IRQ, and then performs a REPEATED START using the address received from the SGbus slave device $714_1$-$714_n$. A REPEATED START condition 928 (see FIG. 9) is provided by driving the SDA line/wire 922 low while the SCL line/wire 924 is high during a Bus-Busy state, and when a STOP CONDITION 908 would be expected. Devices $714_1$-$714_n$, $716_1$-$716_m$ and/or $704_1$-$704_k$ may monitor the bus for their respective addresses after detecting a REPEATED START condition 928.

The primary SGbus master device 712 may optionally configure the data transfer mode using the Data Transfer Protocol byte when, for example, the previously defined mode is different from a presently desired or required mode. The primary SGbus master device 712 and the interrupting SGbus slave device $714_1$-$714_n$ may then commence communicating. Bus contention takes place during address evaluation, and any additional SGbus devices $714_1$-$714_n$, $716_1$-$716_m$ and/or any legacy I2C devices $704_1$-$704_k$ trying to win the bus at the same time will lose the arbitration and may retry on the next Bus-Free state 822.

In another example, secondary SGbus master device $716_1$-$716_m$ can assert an in-band IRQ using a procedure that is similar to that for SGbus slave devices $714_1$-$714_n$. When the primary SGbus master device 712 recognizes that the IRQ is asserted by a secondary SGbus master device $716_1$-$716_m$, the primary SGbus master device 712 releases the SCL line 216 and the secondary SGbus master device $716_1$-$716_m$ performs an immediate REPEATED START condition 928 in order to address a target device for communication.

In another example, a legacy I2C Master device 706 may assert an IRQ in a procedure that is similar to that described for secondary SGbus master devices $716_1$-$716_m$. The legacy I2C Master device 706 is typically unaware when it is competing with an SGbus master device 712, since the SGbus master device 712 has an equivalent higher address (e.g., 111 1111) and would lose the arbitration.

A primary SGbus master device 712 that starts a communication transaction evaluates the address arbitration procedure, during an address call. Any SGbus slave device $714_1$-$714_n$, secondary SGbus master device $716_1$-$716_m$, or legacy I2C Master device 706 that attempts to interrupt the primary SGbus master device 712 is typically successful. However, any device that has a lower priority rank may have to wait for the next Bus-Free state 822.

In some instances, there may be a competition between a legacy I2C master device 706 and an SGbus slave device $714_1$-$714_n$. The primary SGbus master device 712 starts the clock signal on the SCL line 216 when it sees a START condition (SDA line 218 low). Accordingly, an SGbus slave device $714_1$-$714_n$ that has a higher priority rank presumptively wins the arbitration process. The primary SGbus master device 712 is aware of the outcome of the arbitration process, including the winning address.

According to certain aspects disclosed herein, an SGbus may be a multi-master bus in which one or more SGbus master devices 712, $716_1$-$716_m$ and a legacy I2C master device 706 provide bus control and management functions for corresponding slave devices. Certain multi-master arbitration and bus control procedures employed in an SGbus may follow a global rule such as is as described for IRQ procedures. Accordingly, I2C rules may apply when a legacy I2C master device 706 competes with one or more SGbus secondary master devices $716_1$-$716_m$.

When an SGbus secondary master device $716_1$-$716_m$ acquires control of the bus 702 to perform a transaction, the SGbus secondary master device $716_1$-$716_m$ maintains control of the bus 702 only for as long as is required to perform the transaction. After the respective transaction, a STOP condition causes the bus control to revert back to the primary SGbus master device 712.

A legacy I2C Master device 706 generally transfers data to legacy I2C slave devices $704_1$-$704_k$, and employs I2C-compliant protocols, even when other data transfer protocols are available. Communications between a legacy I2C Master device 706 and SGbus devices $714_1$-$714_n$, $716_1$-$716_m$, may be managed at the system level. In one example, the primary SGbus master device 712 may inform the legacy I2C Master device 706 of the presence of the SGbus slave devices $714_1$-$714_n$. The primary SGbus master device 712 may provide information regarding local addresses and characteristics of the SGbus slave devices $714_1$-$714_n$. Any resultant communication between the legacy I2C Master device 706 and the SGbus slave devices $714_1$-$714_n$ may be consistent with I2C protocols.

According to certain aspects disclosed herein, an SGbus may support a hot-plug capability in which an SGbus device 712, $714_1$-$714_n$, or $716_1$-$716_m$ may be inserted into a bus 702 that has already been dynamically configured and is operational. A hot-plugged SGbus device 712, $714_1$-$714_n$, or $716_1$-$716_m$ powers up on the bus and assumes a condition similar to a cold power-up, and the hot-plugged SGbus device 712, $714_1$-$714_n$, or $716_1$-$716_m$ does not initially have an assigned local address. A device 712, $714_1$-$714_n$ or $716_1$-$716_m$ that does not have an assigned local address may perform an IRQ using a predefined byte as an indicator that it needs a local address. Upon detecting the IRQ and the presence on the bus 702 of the hot-plugged SGbus device 712, $714_1$-$714_n$, or $716_1$-$716_m$ the primary SGbus master device 712 may perform a dynamic address allocation procedure, such as is described herein. In the context of dynamically added/removed wires/lines and hot plug capabilities, one condition for switching modes into a different number of active wires/lines may be the physical number of wires/lines supported by the added SGbus device (e.g., traffic to that device may be limited to its supported number of wires/lines), the traffic loading imposed by the new SGbus device, or the power consumption target for bus operation involving the added SGbus device.

According to certain aspects disclosed herein, an SGbus may support a plurality of data transfer protocols, including I2C protocols, CCI protocols and variants thereof. The encoding scheme may be selected or tailored to provide efficient, reliable and/or low-latency data transfer for a given number of lines, wires or other connectors. In one example, an HDR protocol based on septenary coding (7-base numbers) may be used to provide a data transport on the SGbus when the SGbus has 3 lines, wires or other connectors. In another example, the HDR protocol may be based on pentadecimal coding (15-base numbers) when the SGbus has 4 lines, wires or other connectors. Other HDR protocols may be employed including, for example, a unitrigesimal coding (31-base numbers) may be employed when the SGbus has 5 lines, wires or other connectors, and so on.

A shared bus may be configured to support communications on a two-line shared bus 702 according to I2C protocols, and communication according to an SGbus protocol using the two-line bus 702 and, at least in some instances, one or more additional wires/lines 718. In one example, a 4-line SGbus configured for septenary and/or pentadecimal coding-based communications and I2C communications may be performed on the two-line shared bus 702, such that in a first time interval, data may be transmitted using septenary and/or pentadecimal encoding and other data may be transmitted in a different time interval according to I2C signaling conventions. In another example, a 5-line SGbus configured for septenary, pentadecimal, and/or unitrigesimal coding-based communications and I2C communications may be performed on the two-wire shared bus 702, such that in a first time interval, data may be transmitted using septenary, pentadecimal, and/or unitrigesimal encoding and other data may be transmitted in a different time interval according to I2C signaling conventions. The SGbus may employ physical layer protocols that ensure that septenary (base-7), pentadecimal (base-15), and/or septenary, pentadecimal, unitrigesimal, and/or other coded SGbus transmissions do not violate I2C protocols.

Figure 9:
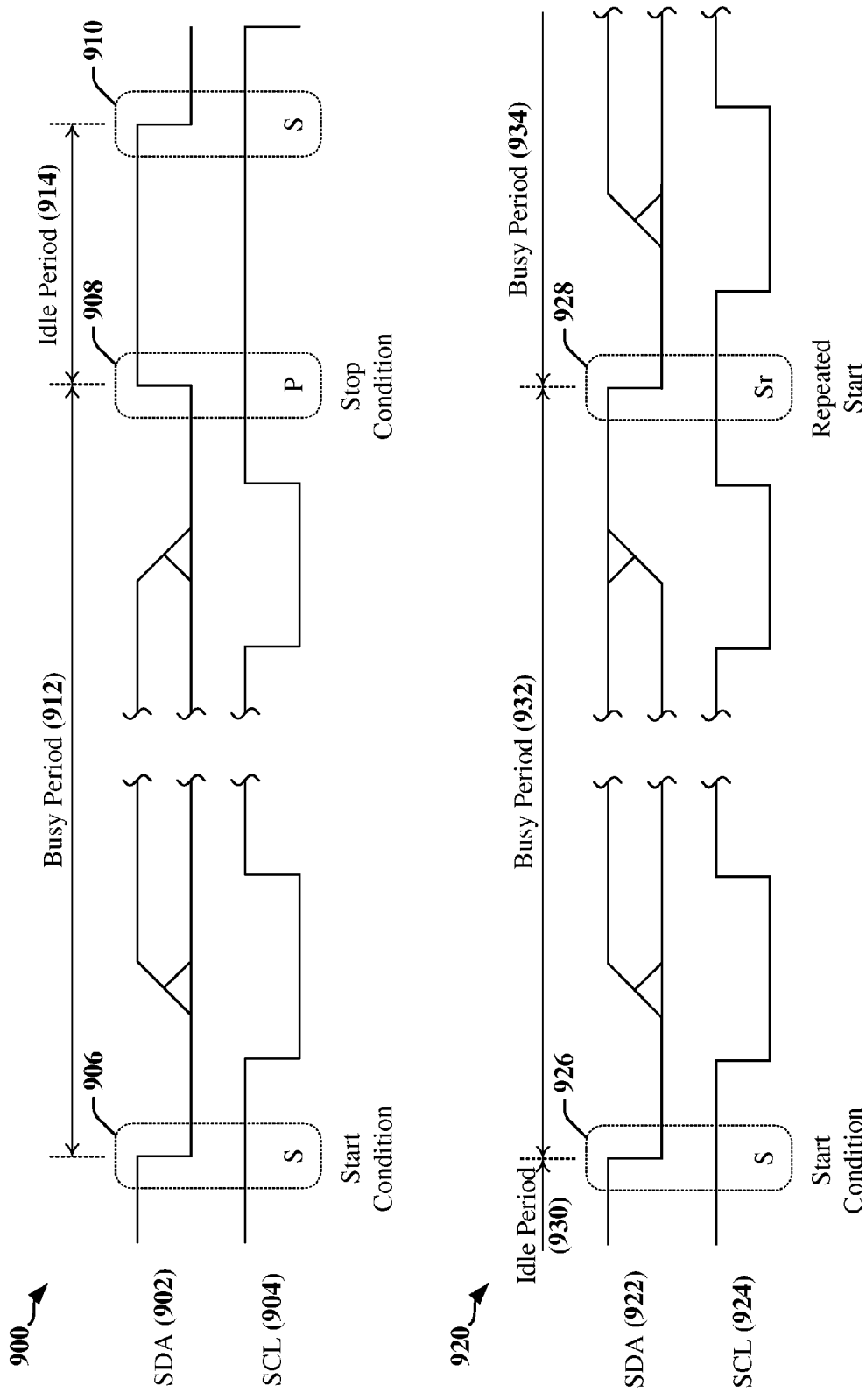
FIG. 9 is a diagram that illustrates timing associated with multiple frames transmitted according to I2C protocols.

FIG. 9 includes timing diagrams 900 and 920 that illustrate timing associated with multiple data transmissions on an I2C bus. In a first basic example, the period of time (the idle period 914) that elapses between a STOP condition 908 and a consecutive START condition 910 may be prolonged, causing the conventional I2C bus to be idle during the idle period 914. In operation, a busy period 912 commences when the I2C bus master transmits a first START condition 906, followed by data. The busy period 912 ends when the I2C bus master transmits a STOP condition 908 and an idle period 914 ensues. The idle period 914 ends with transmission of a second START condition 910.

With reference also to the timing diagram 920, in some instances, the idle periods 914 between successive data transmissions on the I2C bus may be reduced in number or eliminated by transmitting a REPEATED START condition (Sr) 928 rather than a STOP condition 908. The REPEATED START condition 928 terminates the preceding data transmission and simultaneously indicates the commencement of a next data transmission. The state transition on the SDA line/wire 922 is identical for a START condition 926 occurring after an idle period 930 and the REPEATED START condition 928. Specifically, the SDA line/wire 922 transitions from high to low while the SCL line/wire 924 is high. When a REPEATED START condition 928 is used between data transmissions, a first busy period 932 is immediately followed by a second busy period 934.

In an SGbus, the data transfer segment can use any I2C or high data rate (e.g., HDR mode) protocol (e.g., ternary-based coding protocol for two wires/lines, septenary-based coding for three wires/lines, pentadecimal-based coding for four wires/lines, etc.) or variants thereof. The type of data transfer protocol to be used may be indicated by the SGbus master device 712, or $716_1$-$716_m$, at the start of communication with an SGbus slave device $714_1$-$714_n$. The selection of a data transfer protocol for each SGbus slave device $714_1$-$714_n$ remains in effect until changed by the SGbus master device 712, or $716_1$-$716_m$. In some instances, the primary SGbus master device 712 may configure any devices that can communicate in both I2C and high data rate modes (e.g., ternary coding mode, septenary coding mode, pentadecimal coding mode, etc.) to use the I2C mode as a default mode.

An exit from data transfer may be effected by inserting a STOP condition 908 on the bus 702, in which case the bus 702 may enter a Bus-Free state 822. Certain sequences of symbols transmitted in a transaction on the bus 702 may produce signaling states that may be identified as a STOP condition 828, 908 or REPEATED START condition 928 by detection logic of one or more devices $704_1$-$704_n$, $714_1$-$714_n$, $716_1$-$716_m$ that are not participants in the transaction.

Figure 10:
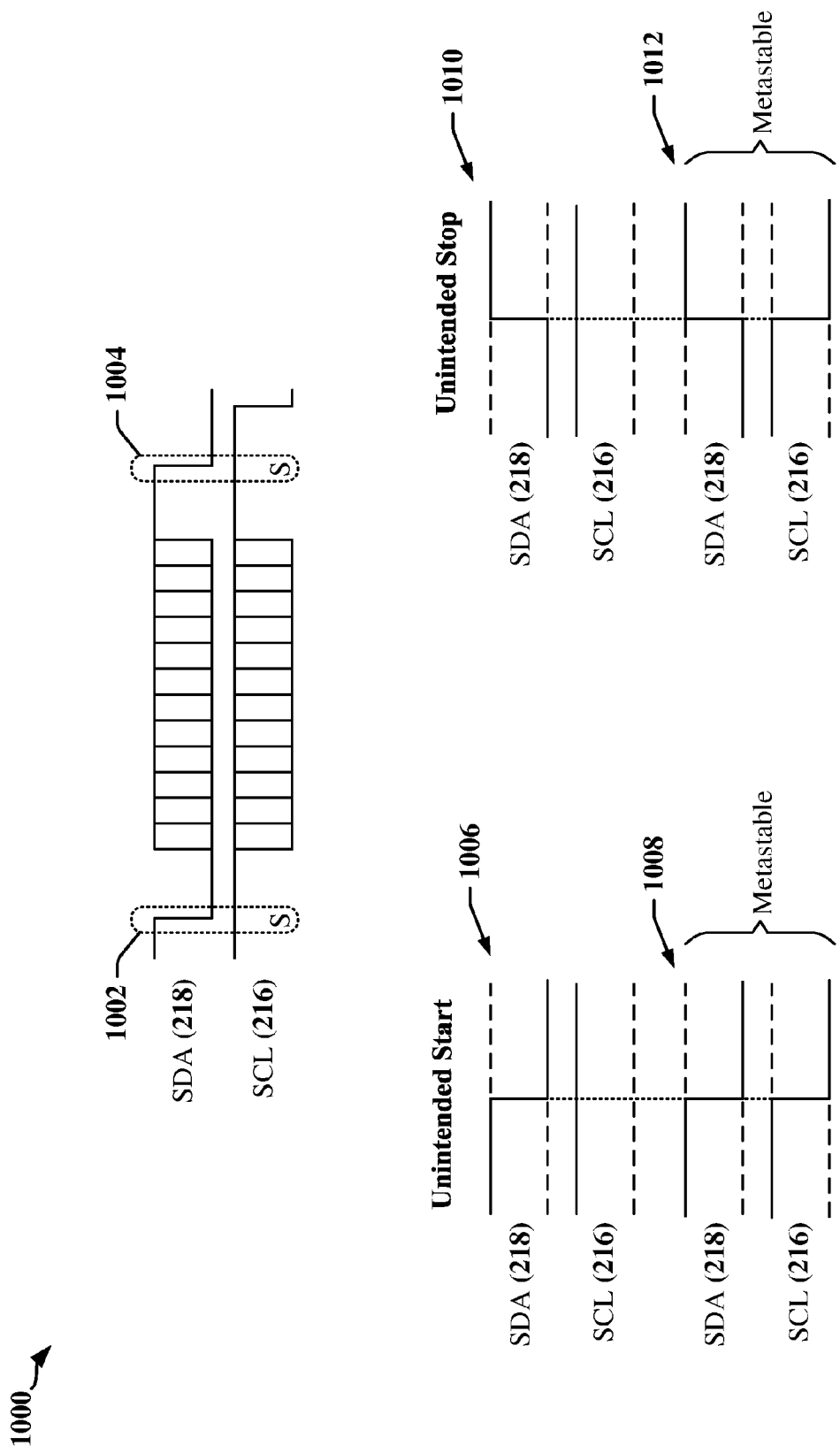
FIG. 10 illustrates the occurrence of unintended I2C START and I2C STOP conditions.

FIG. 10 illustrates the occurrence of unintended START conditions 1006, 1008 and STOP conditions 1010, 1012, which may arise during normal data exchange, after a valid START condition 1002 and before a valid STOP condition (not shown) or REPEATED START condition 1004. In one example, an unintended START condition 1006 may occur when the SCL line 216 is maintained in a high signaling state across two symbols while the SDA line 218 changes from a high signaling state to a low signaling state at the transition between the two symbols. In another example, an unintended START condition 1008 may occur during a metastable period when the SDA line 218 changes from a high signaling state to a low signaling state at the transition between the two symbols while the SCL line 216 is in transition. In another example, an unintended STOP condition 1010 may occur when the SCL line 216 is maintained in a high signaling state across two symbols while the SDA line 218 changes from a low signaling state to a high signaling state at the transition between the two symbols. In another example, an unintended STOP condition 1012 may occur during a metastable period when the SDA line 218 changes from a low signaling state to a high signaling state at the transition between the two symbols while the SCL line 216 is in transition.

These unintended START conditions 1006, 1008 and STOP conditions 1010, 1012 are unwanted, and may be avoided by configuring the encoder to identify sequences of symbols that may cause the unintended START conditions 1006, 1008 and STOP conditions 1010, 1012. The encoder may modify the stream of transmitted symbols to avoid generating the unintended START conditions 1006, 1008 and STOP conditions 1010, 1012. In one example, the coding protocol may provide a binary "00" dummy symbol insertion after any binary "01" symbol in order to avoid unintended STOP conditions 1012 while in data transfer mode. In another example, the coding protocol may provide a binary "10" dummy symbol insertion after any occurrence of a binary "11" symbol to avoid unintended START conditions 1006, 1008, which may cause a legacy I2C device to check for its address after a false START (or REPEATED START) condition 1006, 1008. (Note that the binary numbers {00, 01, 10, 11} refer to a binary number that is 2 bits long). It will be appreciated that the legacy I2C device may respond to a false START condition 1006, 1008 if it finds an address match and thereby adversely affect active drivers configured for SGbus operation.

In high data rate modes, frame synchronization may be performed based on a count of the symbols transmitted on the bus 702, commencing with the first symbol sent after the entry point into data transfer mode. For SGbus operations, there is no need for REPEATED START condition 928 to be sent ahead of each sequence of 12 symbols or sequence of 20 symbols in the frame. The absence of the REPEATED START condition 928 may increase data throughput.

In the example of ternary coding for two wires/lines, frame synchronization can be further verified by checking the last three least significant bits (LSBs), which are used for error detection. For ternary coding, a single error can be detected by checking the last three LSB of the binary decoded number. The single error may relate to a symbol error on any 12-symbol word, where no two consecutive symbols are identical. Symbols may be encoded as binary numbers [SDA:SCL], where the bit corresponding to signaling state of the SDA line 218 is in the most significant bit (MSB) position. One symbol error may be the result of an error in the sampled signaling state of one or both the SDA line 218 or the SCL line 216. A similar approach may be used for symbol coding using a different number base (septenary-based coding, pentadecimal-based coding, etc.) by checking n LSB.

Figure 11:
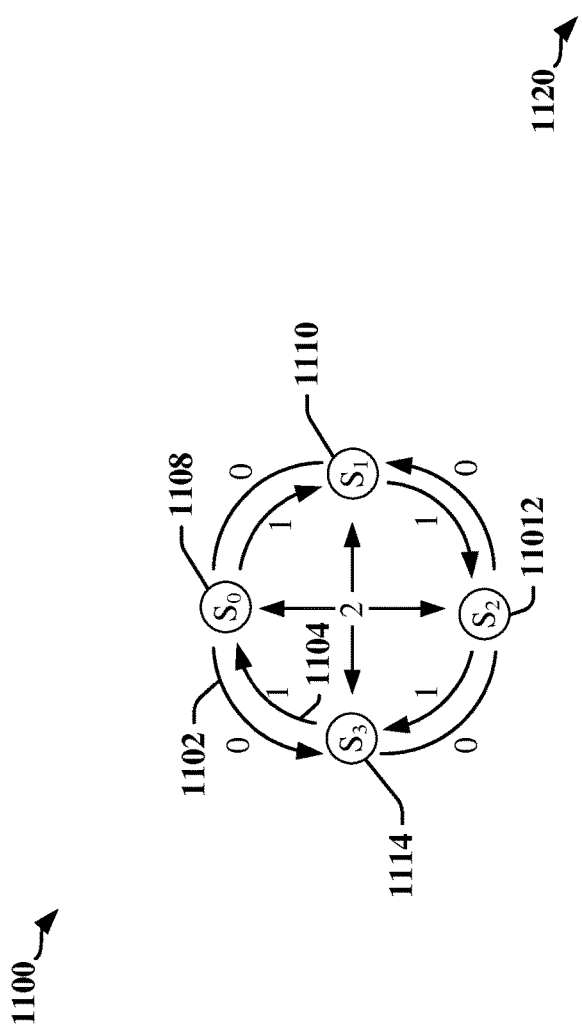
FIG. 11 illustrates certain aspects of an example of an encoding scheme over two wires that may be used in accordance with certain aspects disclosed herein.

FIG. 11 illustrates symbol transitioning for a two-wire symbol coding (e.g., ternary-based number coding) that may be employed for certain types of protocol. It is contemplated that certain concepts associated with symbol transitioning may be expanded to include m-wires in the case of SGbus for example (e.g., septenary-based number coding for 3 wires/lines, pentadecimal-based number coding for 4 wires/lines, etc.). In the example discussed in relation to FIGS. 3-5, the transition numbers 1124 generated by an encoder (e.g. the transcoder 302 of the transmitter 300) may be represented as a displacement value 1122 on and across a circle 502. A clockwise displacement may be represented as a ternary value T=1, a counterclockwise displacement may be represented as a ternary value T=0, and a displacement across the circle 502 (i.e., 2 steps clockwise or counterclockwise) be represented as a ternary value T=2.

In another example, other symbol encoding schemes may be implemented for two wire implementations and/or for implementations using more than two wires. In one example for N wires (W1 . . . WN), where N≥3, for three or more wires, encoding may be characterized by the transition number formula:

$$\{(W1_S \text{XNOR } W1_{S-1}), (W2_S \text{XNOR } W2_{S-1}), \ldots (WN_S \text{XNOR } WN_{S-1})\},$$

for two consecutive states S and S−1.

As an immediate consequence, a line error that produces a symbol identical to either of the adjacent symbols on the circle 502 is not considered a new symbol, and the error may be identified at word level. Additionally, a single symbol error may result in two adjacent ternary numbers being modified.

According to certain aspects disclosed herein, error correction may be provided for SGbus communications. In order to transfer data, the binary string of information may be transformed into an equal numerical value, coded as a base 3 (ternary) number. As such, fewer characters need to be transmitted between the nodes for the same information. The transformed ternary numbers are a polynomial sum, where the factors are the power of 3 and the coefficients are [0, 1, 2].

$$\sum_{i=0}^{mbinary} B_i 2^i = \sum_{k=0}^{mternary} T_k 3^k$$

where: $T_k$=ternary coefficients, $\in[0, 1, 2]$.

One symbol error may produce an alteration of two adjacent $T_k$ values, and the final sum may be altered by the formula:

$$\pm a \times 3^n \pm b \times 3^{(n-1)} \qquad (1)$$

where:
"n"=the rank of erroneous symbol, and
"a" and "b" are coefficients of difference.
The "a" and "b" coefficients respect the following:

$$a \in [0, \pm 1, \pm 2]$$

$$b \in [0, \pm 1, \pm 2]$$

Formula (1) can be written as:

$$(\pm 3a \pm b) \times 3^{(n-1)} \qquad (2)$$

In order for the last bits of the LSB to be left unchanged by the error, formula (2) must be a multiple of the power of 2. The first rank of power of 2 that is not an integer multiple denotes how many LSB end bits must be known in advance so that one symbol error shall be identified. The factor $3^{(n-1)}$ is a multiple of 3 and it will change the LSB bits, if unaltered.

An analysis of the relevant factor ($\pm 3a \pm b$) may be based on the observation that the symbol-to-ternary coding diagram has a circular symmetry. Therefore, one point covers all four points. For example, if "2" is the correct symbol, then for any other correct symbol situation, it suffices to replace the respective positions with their rotated values. Table 1 below shows the possible resultant "a" coefficients, and Table 2 shows the possible resultant "b" coefficients.

TABLE 1

| Correct Symbol | Past Symbol | Correct Ternary | ERROR Symbol | ERROR Ternary | ERROR coefficient "a" |
|---|---|---|---|---|---|
| 2 | 1 | 1 | 3 | 2 | 1 |
|   |   |   | 0 | 0 | -1 |
|   | 0 | 2 | 3 | 0 | -2 |
|   |   |   | 1 | 1 | -1 |
|   | 3 | 0 | 1 | 2 | 2 |
|   |   |   | 0 | 1 | 1 |

TABLE 2

| Correct Symbol | New Symbol | Correct Ternary | ERROR Symbol | ERROR Ternary | ERROR coefficient "b" |
|---|---|---|---|---|---|
| 2 | 1 | 0 | 3 | 2 | 2 |
|   |   |   | 0 | 1 | 1 |

TABLE 2-continued

| Correct Symbol | New Symbol | Correct Ternary | ERROR Symbol | ERROR Ternary | ERROR coefficient "b" |
|---|---|---|---|---|---|
|   | 0 | 2 | 3 | 1 | -1 |
|   |   |   | 1 | 0 | -2 |
|   | 3 | 1 | 1 | 2 | 1 |
|   |   |   | 0 | 0 | -1 |

Table 3 below shows the possible resultant combinations of "a" and "b" coefficients.

TABLE 3

| Correct Symbol | ERROR Symbol | a | a | b | b |
|---|---|---|---|---|---|
| 2 | 3 | 1 | -2 | 2 | -1 |
|   | 1 | -1 | 2 | -2 | 1 |
|   | 0 | -1 | 1 | 1 | -1 |

The possible (a;b) pairs are shown on the same background row, as related to the same possible "ERROR Symbol." A direct inspection reveals that there are combinations that will make, respectively:

($\pm 3a \pm b$)=2, e.g. (1;-1) and (-1;1), ($\pm 3a \pm b$)=4, e.g. (-2;2) and (2;-2).

There are no pairs that would yield ($\pm 3a \pm b$)=8; that would have been possible only for (2;2) or (-2;-2).

Therefore, any known three bits at the LSB end will detect any one single symbol error. For example 3'b000 may be used, although any other three known bits may play the same role. (Note that 3'bxxx refers to a binary number that is 3 bits long). Any error in the SDA line 218, or the SCL line 216 may be detected by the last three bits.

According to certain aspects disclosed herein, a supplementary error check can be based on the mandatory translation from symbol 2'b01 to 2'b00, or the mandatory translation from symbol 2'b11 to 2'b10, as necessary to avoid the false identification of a STOP condition 908 or REPEATED START condition 928 while data transfer is in progress. At the completion of the entire data transfer of a plurality of 12-symbol or 20-symbol frames, 4 symbols may be inserted, of which the last two may be 2'b01 followed by 2'b11, in order to produce a STOP condition 828, 908.

Figure 12:
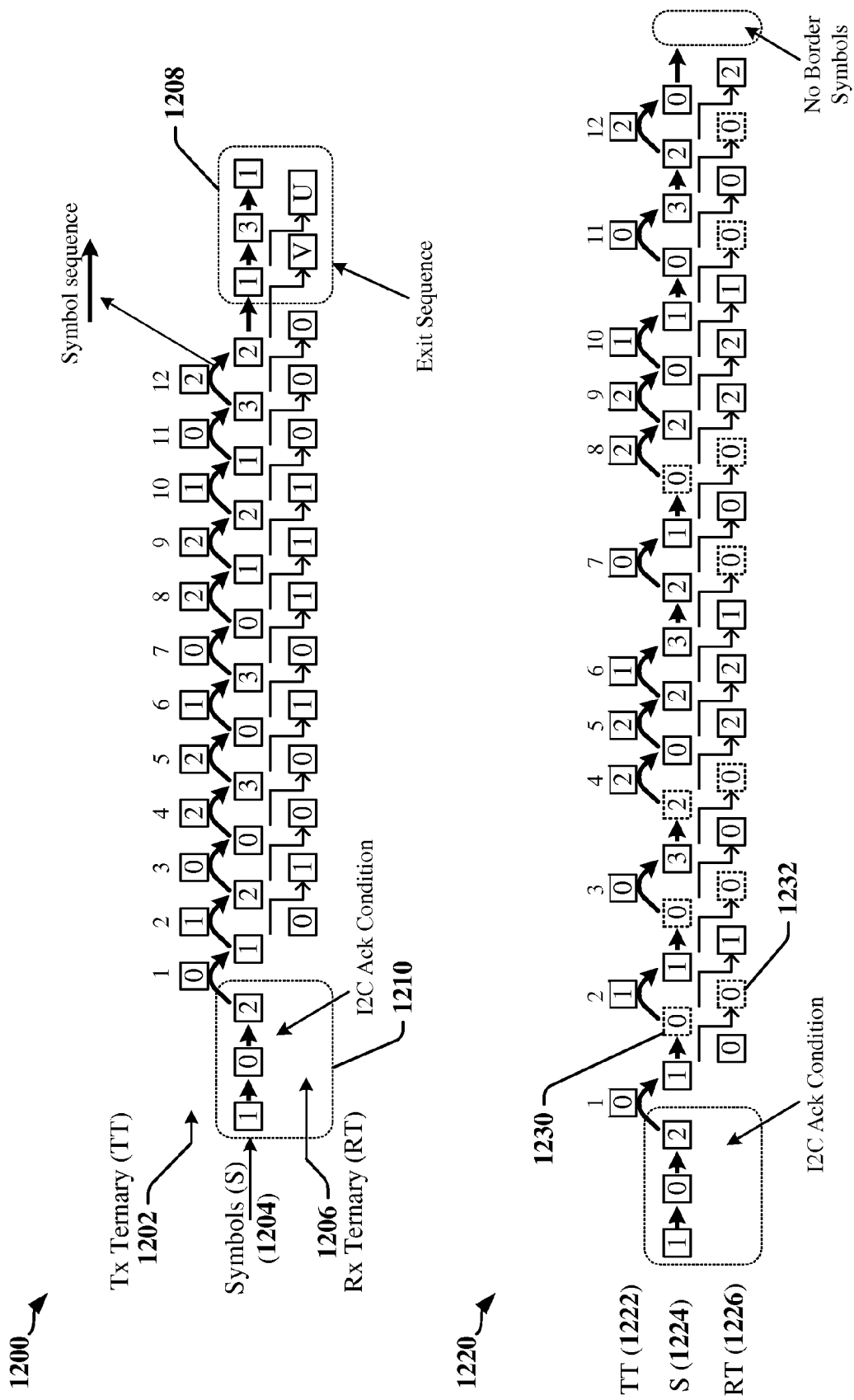
FIG. 12 illustrates examples of symbol coding schemes used for sensor global bus transmissions.
Figure 13:
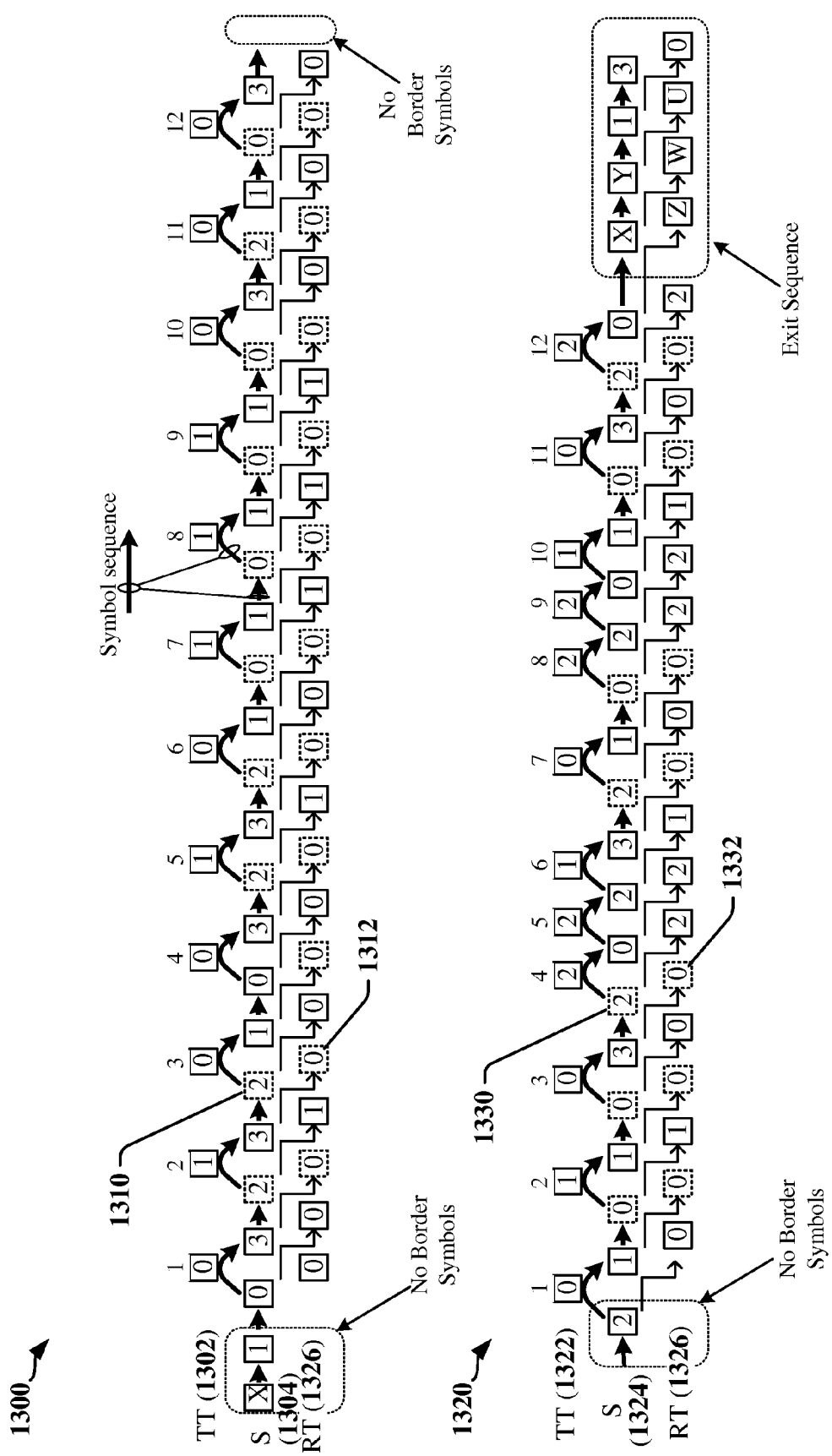
FIG. 13 illustrates further examples of symbol encoding schemes used for sensor global bus transmissions.

With reference to FIGS. 12 and 13, certain differences between prior implementations of ternary coding and the presently described SGbus may be highlighted. For example, the two coding styles may produce different symbols, although the decoded ternary coefficients are the same in both cases. In another example, the SGbus avoids the unintended (and unwanted) STOP conditions 908 and REPEATED START conditions 928 (i.e. the 2'b01 to 2'b11 transition, or the 2'b11 to 2'b10 translation) on the bus 702. For some data streams then, SGbus adds symbols to the transmission, thereby decreasing the data throughput.

In a first example, the timing diagram 1200 of FIG. 12 illustrates a sequence of transmitter ternary (Tx) transition numbers 1202 provided by a transcoder 302 of a transmitter 300 to a ternary-to-symbols encoder 304 (see FIG. 3). The converter produces a stream of symbols 1204 for transmission over the serial bus 230 to a receiver 320. A symbols-to-ternary decoder 324 of the receiver 320 produces receiver (Rx) transition numbers 1206. There is a direct relationship between the number of Tx transition numbers 1202, the symbols 1204 and the ternary Rx transition numbers 1206.

In a second example, the timing diagram 1220 of FIG. 12 illustrates transmission of a first SGbus data frame, whereby a sequence of transmitter (Tx) ternary numbers 1222 provided by the transcoder 302 to the ternary-to-symbols encoder 304 (see FIG. 3). Here, the ternary-to-symbols encoder 304 produces a stream of symbols 1224 that includes inserted additional symbols 1230. A symbols-to-ternary decoder 324 of the receiver 320 produces receiver (Rx) transition numbers 1226. The decoder 324 produces ternary Rx transition numbers 1226 that include additional numbers 1232 that are extracted by the transcoder 322.

FIG. 13 includes third and fourth examples in the timing diagram examples 1300 and 1320, whereby the third example 1300 relates to a middle and/or worst case SGbus frame, and the fourth example 1320 relates to a last SGbus data frame. In these examples 1300, 1320, the ternary-to-symbols encoder 304 produces a stream of symbols 1304, 1324 that includes inserted additional symbols 1310 and 1330. A symbols-to-ternary decoder 324 of the receiver 320 produces receiver (Rx) transition numbers 1306, 1326. The symbols-to-ternary decoder 324 produces ternary Rx transition numbers 1306, 1326 that include additional ternary numbers 1312 and 1332 that are extracted by the transcoder 322.

In another example, all types of I2C devices may be assumed to be coupled to the bus 702, and a 20-symbol modified ternary symbol encoded data transfer mode may be used, with a REPEATED START condition 928 inserted before each 20-symbol frame. In this mode, no dummy translation is inserted, and no legacy I2C masters can be connected to the bus 702. In yet another example, only legacy I2C devices are on the bus 702 and primary master device controls the bus in I2C mode, with all data transfers using I2C modes, as per the capability of the bus.

Certain Characteristics of an Exemplary SGbus

As disclosed herein, the SGbus can be a high-speed serial interface bus that may provide multi-drop and multi-master capabilities, using two wires. A conventional clock signal is not required and symbols transmitted using both wires are encoded within data. Clock information is embedded in a stream of symbols by ensuring a transition in signaling state of at least one of the two signal wires between each pair of consecutive symbols. An SGbus protocol may use command codes. An in-band interrupt capability is provided, and asynchronous hot-plug with low latency is supported. SGbus devices can co-exists on the same bus as I2C devices, obeying the same restrictions that apply to legacy I2C devices that might be connected to the same physical bus.

In one aspect, the SGbus communicates using a container architecture, whereby data transfer is encapsulated between bus management elements. Data may be transferred using one of a plurality of protocols, as required or preferred by client devices connected to the bus. In one example, data may be transferred using symbol coding protocols (e.g., septenary number based for 3 wires/lines, pentadecimal number based for 4 wires/lines, etc.) and, in another example, data may be transferred according to I2C compliant protocols (e.g., over two wires/lines where one wire/line is used for a clock and the other wire/line is used for serial data transmissions). Data payload is typically carried using symbol coding protocols (e.g., ternary-based coding for 2 wires/lines, septenary-based number for 3 wires/lines, pentadecimal-based number for 4 wires/lines, etc.), although legacy I2C slaves may be addressed and payloads transported in corresponding I2C mode protocols.

Bus management functions associated with the SGbus protocol may include bus arbitration, in-band interrupt, hot-plug, multi-master, entry and exit into data transfer modes.

An SGbus master device may have a dynamic address assignment capability. The SGbus master may include a clock generator used for in-band interrupts, a register based memory for retaining the addresses and characteristics of devices connected to the bus. The SGbus master device may communicate using either I2C or HDR data transfer protocols (e.g., using ternary-based symbol coding, septenary-based symbol coding, pentadecimal based symbol coding, etc.).

An SGbus slave may be dynamically addressable, and may be able to request and receive its address for the bus on which it is connected. The SGbus slave device supports at least high data rate protocols (e.g., using ternary-based symbol coding, septenary-based symbol coding, pentadecimal based symbol coding, etc.) and, in some examples, an SGbus slave device may be capable of communicating using legacy I2C protocols.

The SGbus supports HDR transfer protocol, including a data transfer protocol that adopts a n-based symbol coding (e.g., where n is 3, 7, 15, etc.), which can provide an optimized (least amount of energy per byte) during transmission. An in-band IRQ procedure may be supported and minimal latency restrictions (typically 10 μs) may be imposed. Increased efficiency may be obtained because there is no need for a heartbeat-type signal. Asynchronous, hot-plug capability may be provided.

In some instances, increased system design flexibility is achieved by configuration at local system design level. Dynamic addressing reduces or eliminates dependency on global addressing entities. Dynamic addressing employs random address generators, thereby easing manufacturing overhead.

Certain implementations of the SGbus can fully co-exist with all legacy I2C devices. However, the presence of certain low-speed and ultra-low-cost legacy I2C devices may prevent the use of legacy I2C masters. Legacy I2C devices need not evaluate their address match on the line for every symbol coded frame.

Exemplary Three or More Wire Symbol-Encoding Protocol

In some instances, enhanced capability and speed increases may be obtained by the addition of one or more supplementary lines, enabling a change in the coding base to higher numbers. For example, in addition to a two-wire bus, many I2C legacy systems use one or more dedicated interrupt lines between a master device and one or more slave devices. These dedicated interrupt lines may be repurposed (along with the two-wire bus) when the master device switches from a predefined base protocol (e.g., I2C) to a second protocol in which data symbols are encoded across the two-wire bus and one or more dedicated interrupt lines.

For example, using the two-line bus plus a single additional line, the second protocol is able to transmit 8 symbols over 3 wires (as compared to only 4 symbols over 2 wires), thus allowing for coding in base 7.

Figure 14:
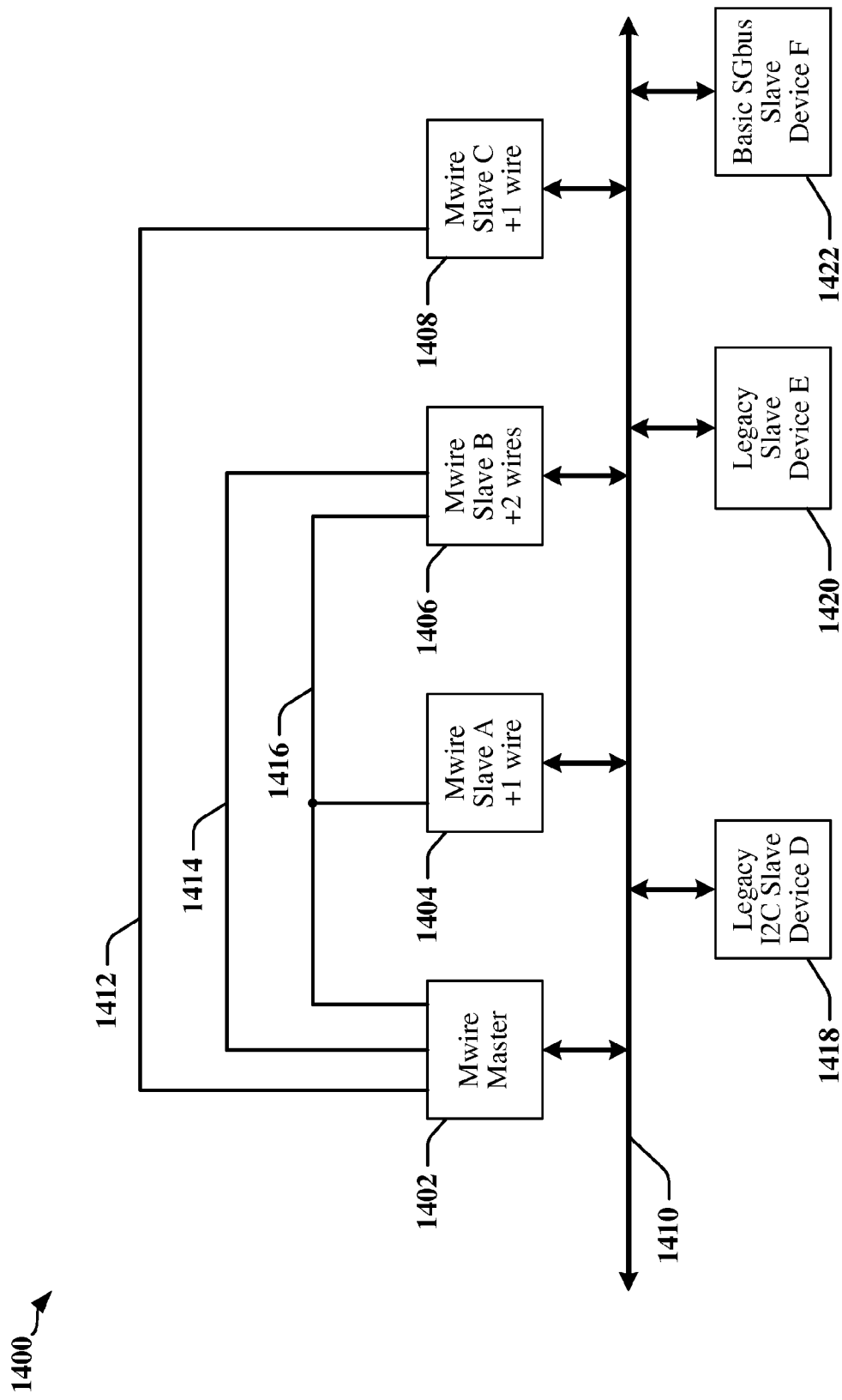
FIG. 14 illustrates a configuration of different devices connected to a common serial bus, where some devices may use additional connectors according to certain aspects disclosed herein.

Referring to FIG. 14, more than two connectors or wires may be available for timeshared communication between SGbus devices 1402, 1404, 1406, and/or 1408, which may be referred to as multi-wire (Mwire) devices 1402, 1404, 1406, and/or 1408. Note that the terms "connector", "wire", and "line" may be interchangeably used herein to refer to an electrically conductive path. In some instances, a "connector", "wire", and "line" may apply to an optically conductive path. In addition to the common lines 216, 218 of a 2-wire SGbus, additional connectors or wires 1412, 1414, and/or 1416 may be employed to couple an Mwire master device 1402 to one or more Mwire slave devices 1404, 1406, and/or 1408 separately from the SGbus 1410. In one example, one Mwire slave device 1408 may be connected to the Mwire master device 1402 using a single, dedicated additional connector or wire 1412. In another example, one Mwire slave device 1404 may be connected to the Mwire master device 1402 using a single, shared additional connector or wire 1416. In another example, one Mwire slave device 1406 may be connected to the Mwire master device 1402 using two or more dedicated and/or shared additional connectors or wires 1414 and 1416. The number, type and arrangement of additional connectors or wires 1412, 1414, and/or 1416 can be selected to balance bandwidth and power consumption for communications between Mwire devices 1402, 1404, 1406, and/or 1408. In some instances, the additional connectors may include optical or other types of connectors.

According to one or more aspects, any number of wires that is greater than two physical lines can be used in an SGbus interface. Two of the wires may be common wires, such as the SCL line 216 and SDA line 218 wires that are used for communicating with legacy devices 1418, 1420 and/or SGbus devices 1422 that are not configured for multi-wire operation. Legacy devices 1418, 1420 may include I2C device 1418, an SGbus device 1422, or another type of device that uses a two wire protocol compatible with other devices 1402, 1404, 1406, 1408, 1418, 1420, 1422 coupled to the shared bus 1410.

Bus management messages may be included in shared bus management protocols implemented on the Mwire-capable bus clients 1402, 1404, 1406, and 1408. Bus management messages may be transferred between Mwire-capable devices 1402, 1404, 1406, and 1408 using the two-wire (shared) bus 1410. Bus management messages may include address arbitration commands and/or messages, commands and/or messages related to data transport mode entry and exit, commands and/or messages used in the exchange of configuration data including, for example, messages identifying supported protocols, number and allocation of available physical wires, and commands and/or messages that are to negotiate or select a mode of communications.

As illustrated in FIG. 14, different legacy client devices 1418 and 1420 and SGbus devices 1422 that have more basic signaling capabilities may be supported by the SGbus interface. The devices 1402, 1404, 1406, 1408, 1418, 1420, 1422 coupled to the shared bus 1410 are compatible with at least one common mode of communication (e.g., predefined base protocol over the two-wire bus 1410). In one example the predefined base protocol (e.g., lowest common denominator protocol), may support an I2C mode of communication. In this latter example, each of the devices 1402, 1404, 1406, 1408, 1418, 1420, 1422 may be adapted to at least recognize start and stop conditions defined by the predefined base protocol.

Two or more devices 1402, 1404, 1406, 1408, 1420, and/or 1422 may communicate using a second protocol that is not supported by some of the other devices coupled to the shared bus 1410. The two or more devices 1402, 1404, 1406, 1408, 1418, 1420, 1422 may identify capabilities of the other devices using the predefined base protocol (e.g., an I2C protocol), after an SGbus exchange is initiated, and/or through signaling on one or more additional connectors or wires 1412, 1414 and/or 1416. In at least some instances, the configuration of devices coupled to the shared bus 1410 may be predefined in the devices 1402, 1404, 1406, 1408, 1418, 1420, 1422.

The additional connectors or wires 1412, 1414 and/or 1416 may include multipurpose, reconfigurable connectors, wires, or lines that connect two or more of the Mwire devices 1402, 1404, 1406, 1408. The additional connectors or wires 1412, 1414 and/or 1416 may include repurposed connections that may otherwise provide inter-processor communications capabilities including, for example interrupts, messaging and/or communications related to events. In some instances, the additional connectors or wires 1412, 1414 and/or 1416 may be provided by design. In one example, the predefined base protocol may utilize the additional connectors or wires 1412, 1414 and/or 1416 for sending interrupts from the slave devices to the master device. In the second protocol, the additional connectors or wires 1412, 1414 and/or 1416 may be repurposed to transmit data symbols in combination with the two-wire bus.

Master and Slave roles are typically interchangeable between Mwire devices 1402, 1404, 1406, 1408, and FIG. 5 relates to a single interaction between two or more of the devices 1402, 1404, 1406, 1408, and/or 1422. As illustrated, the current master device 1402 can support extended communication capabilities with the other Mwire devices 1404, 1406, 1408, using a combination of the additional connectors or wires 1412, 1414, and 1416. The master Mwire device 1402 is connected to two slave devices 1404 and 1408 using a single additional connector or wire 1416 and 1412, respectively. The master Mwire device 1402 is connected to one slave device 1406 using a pair of additional wires 1414 and 1416. Accordingly, the master Mwire device 1402 may be configured to select a number of wires for communication based on the capabilities of all slave devices 1404, 1406, and/or 1408 that are involved in a transaction. For example, the Mwire master device 1402 may send data symbols to the first Mwire slave device B 1406 using the two-wire bus 1410 plus both repurposed wires 1414 and 1416. Additionally, the Mwire master device 1402 may send data symbols to the second Mwire slave device A 1404 using the two-wire bus 1410 plus a first repurposed wire 1416.

Data transmitted between two or more Mwire-capable devices 1402, 1404, 1406, and/or 1408 may be encoded using an adapted encoding scheme (e.g., second protocol). FIGS. 2-14 illustrated the repurposing of the two-wire bus to transmit data symbols encoded over the two wires. However, one aspect provides for extending this protocol and approach of FIGS. 2-14 to three or more wires by repurposing any additional available wires, connectors, or lines between a master device and a slave device. In this manner, the two-wire bus (FIG. 2, lines 216 and 218) and one or additional connectors or wires 1412, 1414, and/or 1416 may be used to transmit data symbols encoded across all wires. In various examples, when three connectors, wires or lines 216, 218, 1412, 1414, and/or 1416 are available, data may be encoded in 3-bit symbols, when four connectors, wires or lines 216, 218, 1412, 1414, and/or 1416 are available, data may be encoded in 4-bit symbols, and so on.

Figure 15:
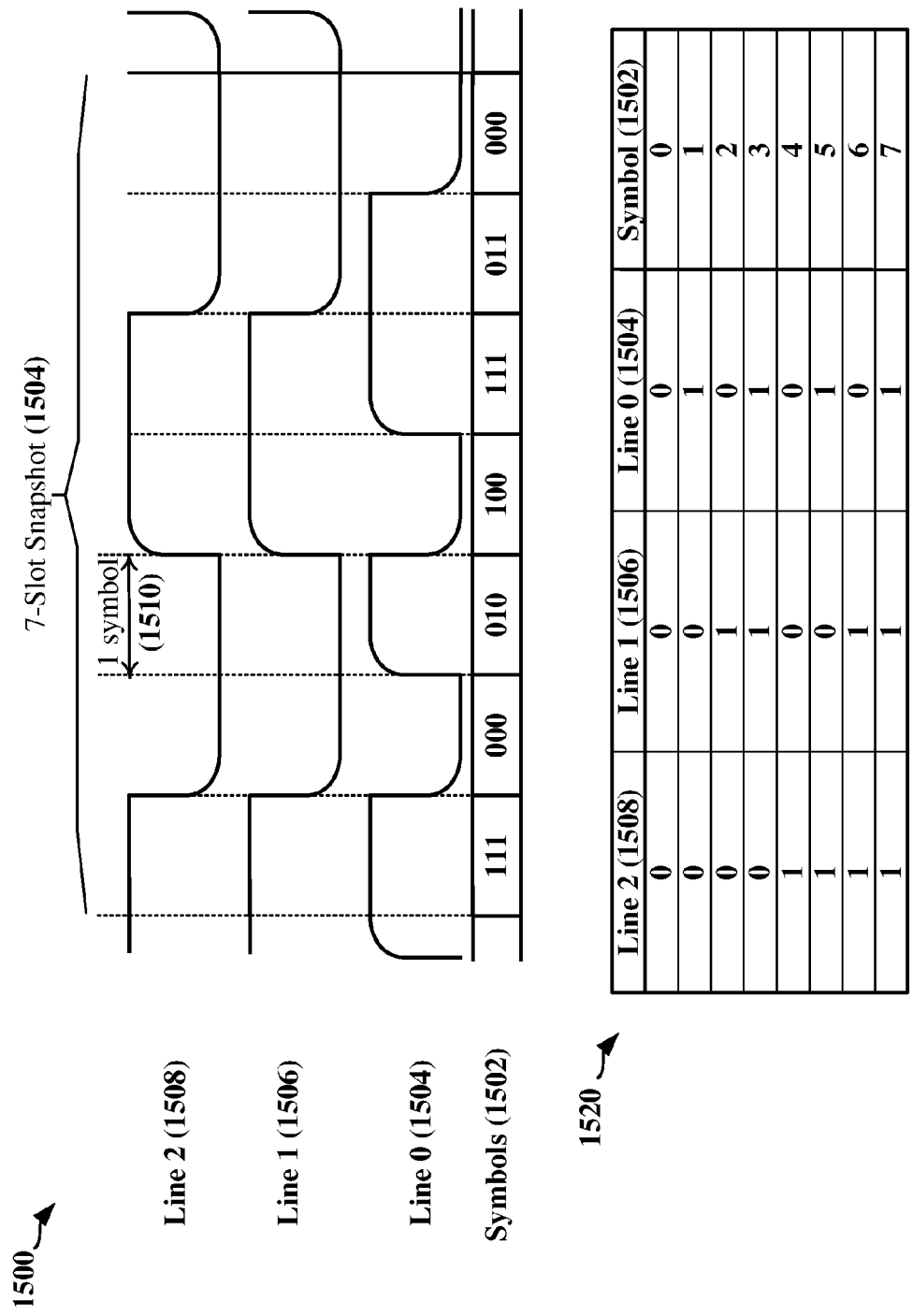
FIG. 15 illustrates an example of data symbol encoding three conductors or wires in accordance with certain aspects disclosed herein.

FIG. 15 illustrates an example illustrating the encoding of data in symbols across three conductors or wires. A sequence of 7 symbols is illustrated, although data elements may be encoded in any number of symbols and/or symbols having any number of wires, lines or connectors. In the example, data is encoded in symbols 1502 that control the signaling state of three connectors 1504, 1506 and 1508 in each time slot 1510 corresponding to a symbol transmission interval. The table 1520 illustrates one example of mapping three-bit symbols 1502 to signaling states that can have one of two levels. Transmit clock information may be encoded in the transitions in signaling state between consecutive symbols. In one example, the clock information may be embedded in signaling states transitions of the common connectors, wires or lines 216, 218, with the additional connector or wires 1412, 1414, and/or 1416 being used to carry one additional bit in each symbol. However, certain devices 1402, 1404, 1406 or 1408 may be configured to increase data throughput even further by extracting clock information from transitions that occur on any of the connectors used in a communications transaction.

In the example of a three-wire connection, 8 possible symbols can be defined, as illustrated in the table 1520 of FIG. 15. Consequently, there are 7 possible transition characters, $\{T_0 \ldots T_6\}$ for each transition between symbols, when a transition is to be guaranteed at each boundary between consecutive symbols. A transition number can be formed that has 12 Base-7 digits (i.e., septenary numbering scheme). In the general case discussed herein, a transition number having N digits with r possible transitions for each digit has a total of $r^N$ states. In the example of a 12 digit transition number transmitted on an SGbus, there are a total of r=8−1=7 possible transitions for each of the N=12 digits 526, providing a total of $7^{12}$=13841287201 different states, which may be expressed as the hexadecimal number 0x52801AE1. Consequently, the 12-digit transition number can encode a 33-bit binary numbers, which may use 8,589,934,592 states. The remaining 5251352610 states may be used to carry control codes, or the like.

Figure 16:
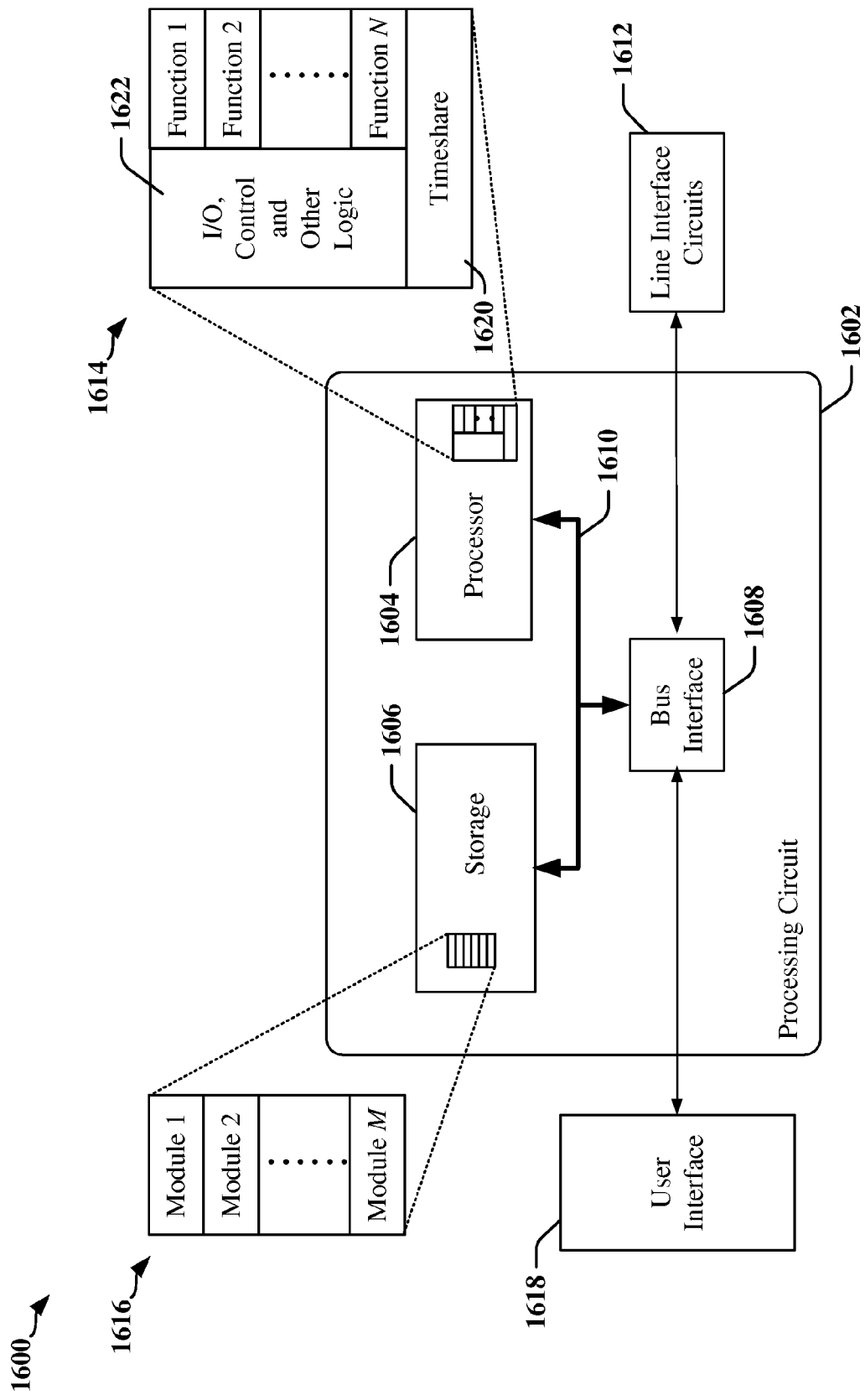
FIG. 16 is a block diagram illustrating an example of an apparatus employing a processing system that may be adapted according to certain aspects disclosed herein.

FIG. 16 is a conceptual diagram 1600 illustrating a simplified example of a hardware implementation for an apparatus employing a processing circuit 1602 that may be configured to perform one or more functions disclosed herein. In accordance with various aspects of the disclosure, an element, or any portion of an element, or any combination of elements may be implemented using the processing circuit 1602. The processing circuit 1602 may include one or more processors 1604 that are controlled by some combination of hardware and soft ware modules. Examples of processors 1604 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, storage 1606. Storage 1606 may include memory devices and mass storage devices, and may be referred to herein as computer-readable media. The bus 1610 may also link various other circuits such as timing sources, timers, peripherals, voltage regulators, and power management circuits, which are well known in the art, and therefore, some of which may not be described any further. A bus interface 1608 may provide an interface between the bus 1610 and line interface circuits 1612. The line interface circuits 1612 provides a means for communicating with various other apparatus over a transmission medium such as a serial bus. Depending upon the nature of the apparatus, a user interface 1618 (e.g., keypad, display, speaker, microphone, joystick) may also be provided, and may be communicatively coupled to the bus 1610 directly or through a bus interface 1608.

A processor 1604 may be responsible for managing the bus 1610 and for general processing that may include the execution of software stored in a computer-readable medium that may include the storage 1606. In this respect, the processing circuit 1602, including the processor 1604, may be used to implement any of the methods, functions and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external computer readable medium. The computer-readable medium and/or storage 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1606 may also include, by way of example, a carrier wave, a transmission line, and any other suitable medium for transmitting software and/or instructions that may be accessed and read by a computer. Computer-readable medium and/or the storage 1606 may reside in the processing circuit 1602, in the processor 1604, external to the processing circuit 1602, or be distributed across multiple entities including the processing circuit 1602. The computer-readable medium and/or storage 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1606 may maintain software maintained and/or organized in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604. When executed, certain instructions may cause the processing circuit 1602 to perform functions in accordance with certain methods, algorithms and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as the line interface circuits 1612, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, storage 1606, processing time, access to the line interface circuits 1612, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, the line interface circuits 1612, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In one example, the multitasking environment may be implemented using a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

Figure 17:
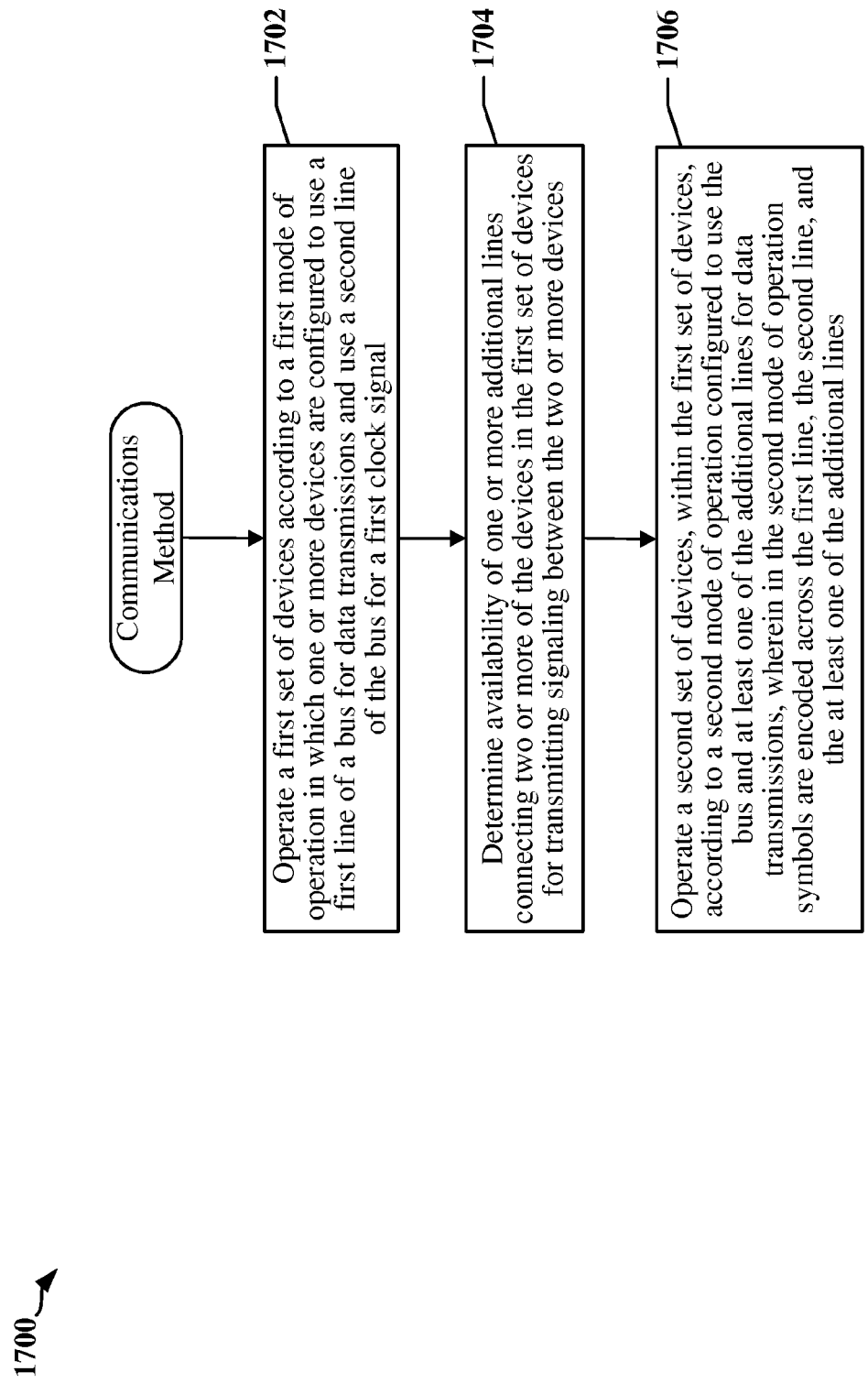
FIG. 17 is a flow chart of a first method for communicating using additional lines with an SGbus in accordance with one or more aspects disclosed herein.

FIG. 17 is a flowchart 1700 illustrating a method for data communications on an SGbus serial interface. Various steps of the method may be performed in an apparatus that includes some combination of the SGbus master device 220, an SGbus slave device 202 illustrated in FIG. 2, the devices 300 or 320 illustrated in FIG. 3, the processing circuit 1602 of FIG. 16, and/or other devices described herein.

At block 1702, a first set of devices may be operated according to a first mode of operation in which one or more devices are configured to use a first line of a bus for data transmissions and use a second line of the bus for a first clock signal.

At block 1702, the availability of one or more additional lines connecting two or more of the devices in the first set of devices for transmitting signaling between the two or more devices may be determined.

At block 1702, a second set of devices within the first set of devices may be operated according to a second mode of operation configured to use the bus and at least one of the additional lines for data transmissions. In the second mode of operation symbols are encoded across the first line, the second line, and the at least one of the additional lines.

Figure 18:
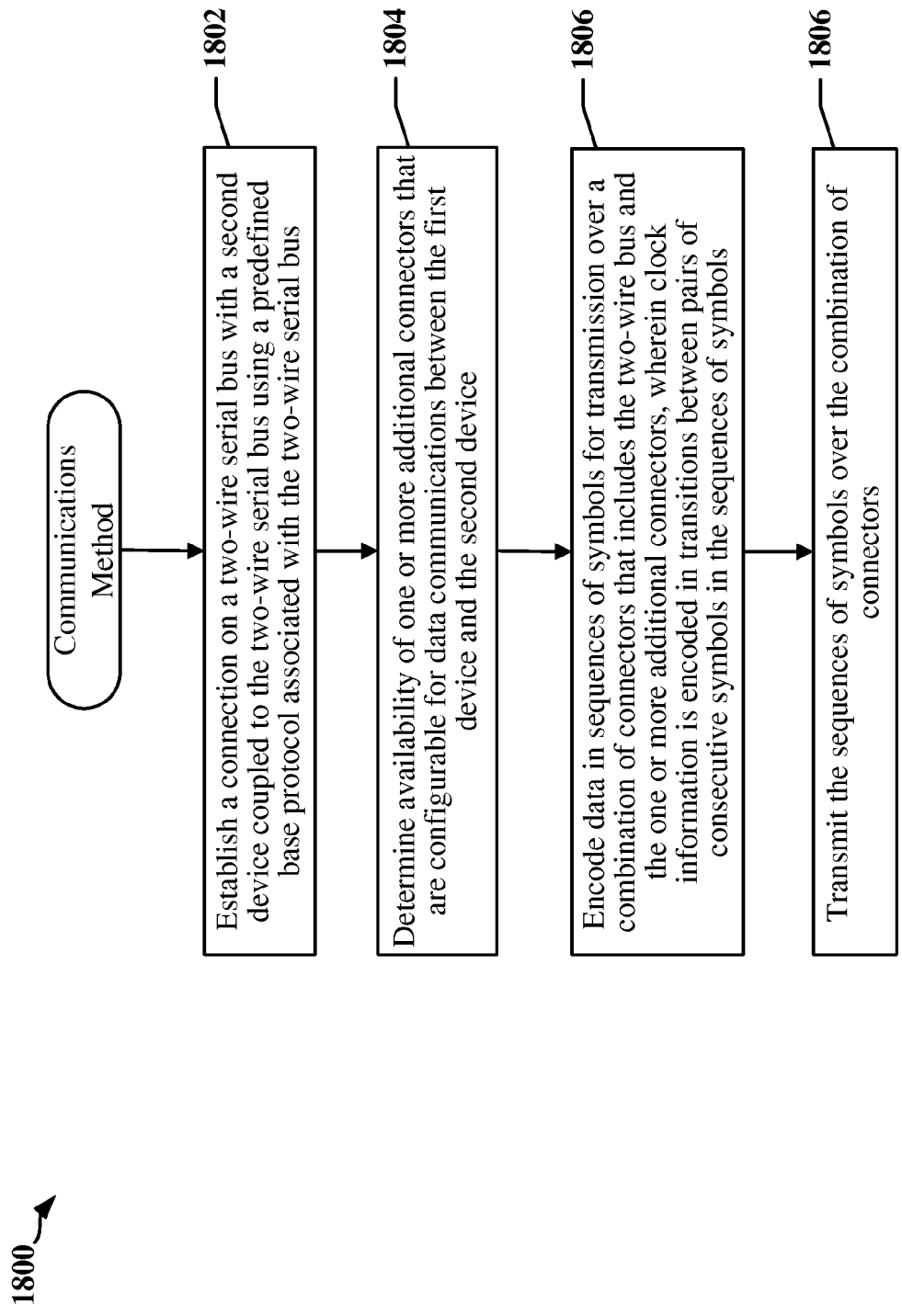
FIG. 18 is a flow chart of a second method for communicating using additional lines with an SGbus in accordance with one or more aspects disclosed herein.

One or more of the first set of devices may be configured to operate in accordance with the flowchart illustrated in FIG. 18.

FIG. 18 is a flowchart 1800 illustrating a method for data communications on an SGbus serial interface. Various steps of the method may be performed by a first device that includes some combination of the SGbus master device 220, the SGbus slave device 202 illustrated in FIG. 2, the devices 300 or 320 illustrated in FIG. 3, the processing circuit 1602 of FIG. 16, and/or other devices described herein.

At block 1802, the first device may establish a connection on the two-wire serial bus with a second device coupled to the two-wire serial bus using a predefined base protocol associated with the two-wire serial bus. The predefined base protocol may be a protocol that is compliant or compatible with an Inter-Integrated Circuit (I2C) mode of data communications. The predefined base protocol may be compliant or compatible with a camera control interface (CCI) data transport mode.

At block 1804, the first device may determine availability of one or more additional connectors that are configurable for data communications between the first device and the second device. The one or more additional connectors may include a connector that is may be configured or operable for transmitting an interrupt signal between the first device and a second device. The one or more additional connectors may include a shared connector that is coupled to at least three devices.

At block 1806, the first device may encode data in sequences of symbols for transmission over a combination of connectors that includes the two-wire bus and the one or more additional connectors. Clock information may be encoded in transitions between pairs of consecutive symbols in the sequences of symbols. Clock information may be encoded in transitions of signaling state of the two-wire serial bus. Clock information may be encoded in transitions of signaling state of the combination of connectors. Each of the sequences of symbols may include 12 symbols, for example. Each of the sequences of symbols may encode a 33-bit binary word.

At block 1808, the first device may transmit the sequences of symbols over the combination of connectors.

In an aspect, the first device may communicate on the two-wire serial bus using the predefined base protocol associated with the two-wire serial bus after the sequences of symbols have been transmitted over the combination of connectors. Communications on the two-wire serial bus using the predefined base protocol may employ only the two-wire-serial bus.

Figure 19:
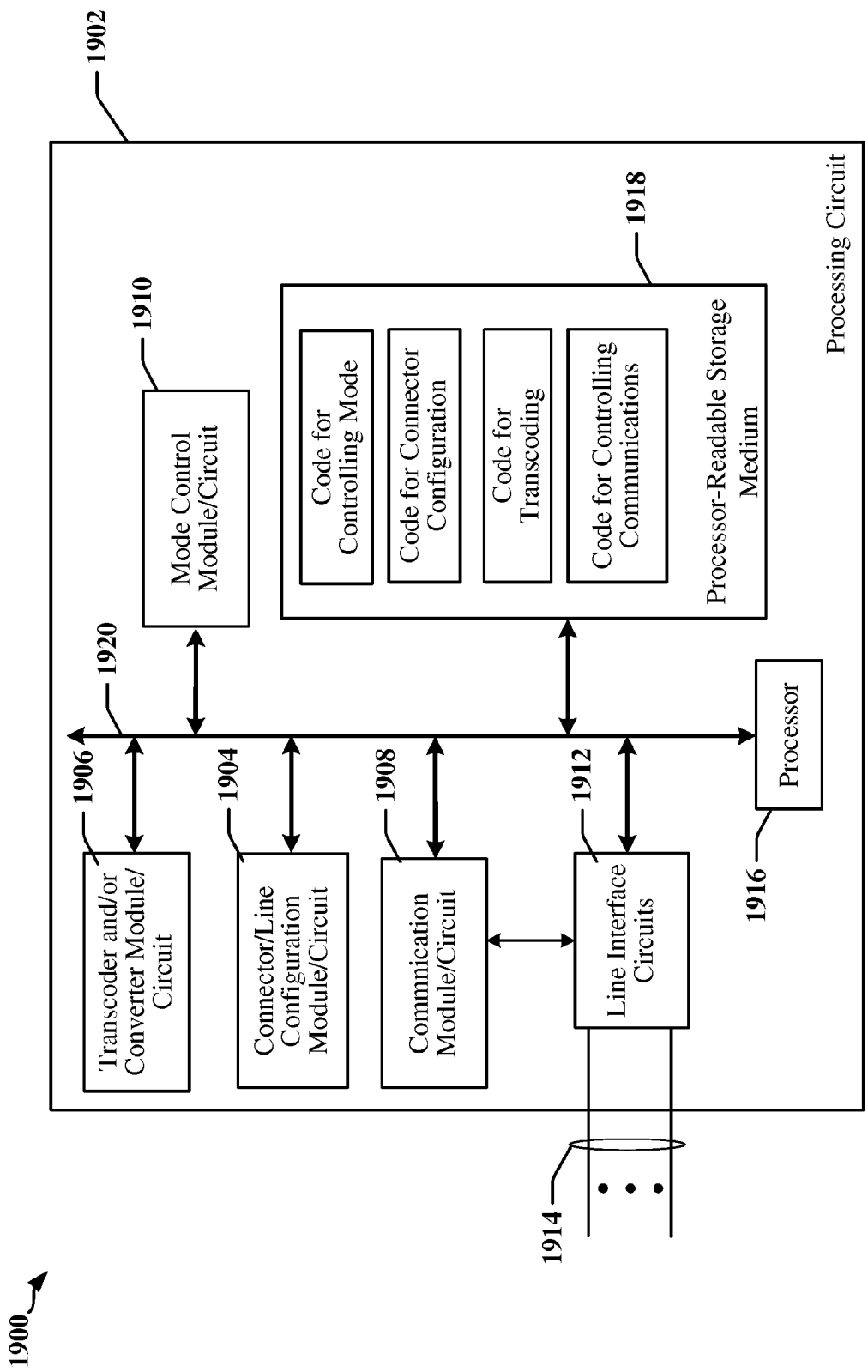
FIG. 19 is a diagram illustrating an example of a hardware implementation for an apparatus that communicates using a two-wire bus in a first mode and dynamically adjusting the two-wire bus to add one or more additional lines in a second mode in which symbols are encoded among the two-wire bus and the one or more additional lines.

FIG. 19 is a diagram illustrating an example of a hardware implementation for an apparatus that communicates using a two-wire bus in a first mode and dynamically adjusting the two-wire bus to add one or more additional lines in a second mode in which symbols are encoded among the two-wire bus and the one or more additional lines. The apparatus 1900 may include a processing circuit 1902 having a processor 1916 that may include one or more of a microprocessor, microcontroller, digital signal processor, a sequencer, a state machine, or the like. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the processor 1916, the modules or circuits 1904, 1906, 1908 and 1910, line interface circuits 1912 configurable to communicate over a multi-wire bus 1914 that includes a plurality of connectors or wires, and the computer-readable storage medium 1918. The bus 1920 may also link various other circuits such as timing sources, peripherals, voltage regulators, and power management circuits, which are well known in the art, and therefore, will not be described any further.

The processor 1916 is responsible for general processing, including the execution of software stored on the computer-readable storage medium 1918. The software, when executed by the processor 1916, causes the processing circuit 1902 to perform the various functions described supra for any particular apparatus. The computer-readable storage medium 1918 may also be used for storing data that is manipulated by the processor 1916 when executing software, including data decoded from symbols transmitted over the multi-wire bus 1914. The processing circuit 1902 further includes at least one of the modules and/or circuits 1904, 1906 and 1908. The modules and/or circuits 1904, 1906, 1908 and 1910 may be software modules loaded, configured and running in the processor 1916, resident/stored in the computer-readable storage medium 1918, one or more hardware modules coupled to the processor 1916, or some combination thereof. The modules and/or circuits 1904, 1906 and 1908 may include microcontroller instructions, state machine configuration parameters, or some combination thereof.

In one configuration, the apparatus 1900 may include a connector/line configuration module and/or circuit 1904 that is adapted to determine available additional connectors/lines and to configure such connectors/lines for communicating with another device. A transcoder and/or converter module and/or circuit 1906 may be configured to encode data in sequences of symbols where the symbols are configured for the number of available wires for transmission. A communication module and/or circuit 1908 may be configured to transmit the sequences of symbols in the signaling state of a two-wire serial bus and one or more additional connectors/lines. The apparatus 1900 may include additional module and/or circuits including, for example, a mode module and/or circuit 1910 that controls the mode of operation of the multi-wire bus 1914 and/or the apparatus 1900. The mode module and/or circuit 1910 may switch between a base predefined protocol (e.g., I2C-compatible protocol over the two-wire serial bus) and a high data rate protocol (e.g., using the two-wire serial bus and dynamically repurposed one or more additional connectors/lines). For example, the mode control module and/or circuit 1910 may include or cooperate with a command generation module that transmits control sequences on the multi-wire bus 1914. In another example, the mode control module and/or circuit 1910 may cause a reconfiguration of the line interface circuits 1912 to enable open-drain line drivers or equivalents thereof in an I2C mode of operation and push-pull drivers in an HDR mode of operation.

The aforementioned means may be implemented, for example, using some combination of a processor or control logic 212, physical layer drivers 210 and 214 and storage media, devices, registers or other 206.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus, comprising:
a bus including a first line and a second line;
a first set of devices coupled to the bus and, in a first mode of operation, configured to use the first line for data transmissions and use the second line for a first clock signal;
one or more additional lines connecting two or more devices in the first set of devices for transmitting signaling between the two or more devices; and
a second set of devices, within the first set of devices, further configured to use the bus and at least one of the additional lines for data transmissions in a second mode of operation,
wherein in the second mode of operation, symbols are encoded across the first line, the second line, and the at least one of the additional lines,
wherein in the second mode of operation, data are encoded in symbols that control signaling state of the first line, the second line, and the at least one of the additional lines such that clock information is embedded in signaling state transitions of one or more of the first line, the second line, and the at least one of the additional line between consecutively-transmitted symbols.

2. The apparatus of claim 1, wherein the first set of devices and second set of devices concurrently monitor at least one of the first line and second line in both the first mode and second mode of operation.

3. The apparatus of claim 1, wherein in the first mode of operation a master device, from the second set of devices, transmits data to a slave device, from the first set of devices or the second set of devices, over the first line of the bus.

4. The apparatus of claim 1, wherein in the second mode of operation a master device, from the second set of devices, transmits data to a slave device, from the second set of devices, over the first line and second line of the bus and the at least one of the additional lines.

5. The apparatus of claim 1, wherein the first mode of operation implements a first protocol for data transmissions over the bus and the second mode of operation implements a second protocol for data transmissions over the bus and the at least one of the additional lines.

6. The apparatus of claim 1, wherein in the second mode of operation the first set of devices receive a reset indicator over the first line and second line inhibiting detection of a valid slave node address.

7. The apparatus of claim 1, wherein in the second mode of operation a reset indicator or stop indicator are avoided in the first line or second line during data transmissions.

8. The apparatus of claim 1, wherein during the first mode of operation a master node, from the second set of devices, sends a first bit sequence over the first line indicating to the second set of devices a switch to the second mode of operation.

9. The apparatus of claim 1, wherein during the second mode of operation a master node sends an exit symbol sequence over the bus indicating to the second set of devices a switch to the first mode of operation.

10. The apparatus of claim 1, wherein in the second mode of operation the second clock signal is embedded within symbol transitions over a first subset of lines while a third clock signal is embedded within symbol transitions over a second subset of lines.

11. The apparatus of claim 1, wherein one or more devices in the second set of devices are capable of operating in both the first mode of operation and the second mode of operation.

12. The apparatus of claim 1, wherein in the first mode of operation the one or more additional lines are used for interrupts communicated from slave devices to a master device within the first sets of devices or the second set of devices.

13. The apparatus of claim 1, wherein the second mode of operation a master device within the second set of devices is adapted to:
ascertain a number of available lines with a particular slave device within the second set of devices;
select one or more of the available lines; and
dynamically adapt a protocol used in the second mode of operation to utilize the bus and the selected one or more of the available lines.

14. The apparatus of claim 13, wherein the protocol used in the second mode of operation is adapted to use a varying number of lines to encode symbols for transmission.

15. The apparatus of claim 1, wherein when a total of three lines are used in the second mode of operation to encode the symbols, a plurality of symbols are further encoded as a septenary-based number.

16. The apparatus of claim 1, wherein when a total of four lines are used in the second mode of operation to encode the symbols, a plurality of symbols is further encoded as a pentadecimal-based number.

17. A method, comprising:
operating a first set of devices according to a first mode of operation configured to use a first line of a bus for data transmissions and use a second line of the bus for a first clock signal;
determining availability of one or more additional lines connecting two or more devices in the first set of devices for transmitting signaling between the two or more devices; and
operating a second set of devices, within the first set of devices, according to a second mode of operation configured to use the bus and at least one of the additional lines for data transmissions, wherein in the second mode of operation, data are encoded in symbols that control signaling state of the first line, the second line, and the at least one of the additional lines such that clock information is embedded in signaling state transitions of one or more of the first line, the second line, and the at least one of the additional line between consecutively-transmitted symbols.

18. The method of claim 17, further comprising:
using the one or more additional lines to communicate an interrupt signal in the first mode of operation.

19. The method of claim 17, wherein the one or more additional lines comprise a shared line that is coupled to at least three devices within the second set of devices.

20. A method performed by a first device coupled to a two-wire serial bus, comprising:
establishing a connection on the two-wire serial bus with a second device coupled to the two-wire serial bus using a predefined base protocol associated with the two-wire serial bus;
determining availability of one or more additional lines that are configurable for data communications between the first device and the second device;
encoding data, according to a high data rate protocol, in sequences of symbols for transmission over a combination of lines that includes the two-wire bus and the one or more additional lines, wherein each symbol in the sequences of symbols controls signaling state of each line of the combination of lines, wherein clock information is encoded in transitions between pairs of consecutively-transmitted symbols in the sequences of symbols; and
transmitting the sequences of symbols over the combination of lines.

21. The method of claim 20, wherein the predefined base protocol is compliant or compatible with an Inter-Integrated Circuit (I2C) mode of data communications.

22. The method of claim 20, wherein the predefined base protocol uses the one or more additional lines to transmit an interrupt signal between the first device and the second device.

23. The method of claim 20, wherein the one or more additional lines comprise a shared line that is coupled to at least three devices.

24. The method of claim 20, wherein each of the sequences of symbols comprise 12 symbols and encodes a 33-bit binary word when a total of 3 wires are used to encode data in sequences of symbols.

25. The method of claim 20, further comprising:
communicating on the two-wire serial bus using the predefined base protocol after transmitting the sequences of symbols over the combination of lines using the high data rate protocol.

26. The method of claim 20, wherein the predefined base protocol is only used for communications over the two-wire serial bus.

27. The method of claim 20, wherein the high data rate protocol, clock information is encoded in transitions of signaling states of the two-wire serial bus.

28. The method of claim 20, wherein the high data rate protocol, clock information is encoded in transitions of signaling states of the combination of lines.

29. The method of claim 20, wherein when combination of lines is equal to at least three total, each of the sequences of symbols is encoded as a septenary-based number.

30. The method of claim 20, wherein when combination of lines is equal to at least four lines total, each of the sequences of symbols is encoded as a pentadecimal-based number.

31. An apparatus, comprising:
a two-wire serial bus;
a first device that includes a communication interface adapted to couple the first device to the two-wire serial bus and configured to communicate using a predefined base protocol associated with the two-wire serial bus;
a second device coupled to the two-wire serial bus and configured to communicate using the predefined base protocol; and
a processing circuit coupled to the communication interface, the processing circuit configured to:
  determine availability of one or more additional lines that are configurable for data communications between the first device and the second device;
  encode data, according to a high data rate protocol, in sequences of symbols for transmission over a combination of lines that includes the two-wire bus and the one or more additional lines, wherein each symbol in the sequences of symbols controls signaling state of each line of the combination of lines, wherein clock information is encoded in transitions between pairs of consecutively-transmitted symbols in the sequences of symbols; and
  transmit the sequences of symbols over the combination of lines.

32. The apparatus of claim 31, wherein the predefined base protocol uses the one or more additional lines to transmit an interrupt signal between the first device and the second device.

33. The apparatus of claim 32, wherein the one or more additional lines comprise a shared line that is coupled to at least three devices.

* * * * *